US010523951B2

(12) United States Patent
Dvir et al.

(10) Patent No.: US 10,523,951 B2
(45) Date of Patent: *Dec. 31, 2019

(54) SYSTEMS AND METHODS FOR PROCESSING A DIGITAL IMAGE

(71) Applicant: Huawei Technologies Co., Ltd., Shenzhen (CN)

(72) Inventors: Itsik Dvir, München (DE); Natan Peterfreund, München (DE); Dror Irony, München (DE); David Drezner, München (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 94 days.

This patent is subject to a terminal disclaimer.

(21) Appl. No.: 15/594,544

(22) Filed: May 12, 2017

(65) Prior Publication Data

US 2017/0280144 A1 Sep. 28, 2017

Related U.S. Application Data

(63) Continuation of application No. PCT/EP2014/074638, filed on Nov. 14, 2014.

(51) Int. Cl.
*H04N 19/174* (2014.01)
*H04N 19/119* (2014.01)
(Continued)

(52) U.S. Cl.
CPC ........... *H04N 19/174* (2014.11); *G06T 3/602* (2013.01); *H04N 19/119* (2014.11); *H04N 19/14* (2014.11);
(Continued)

(58) Field of Classification Search
CPC .. H04N 19/176; H04N 19/119; H04N 19/196; H04N 19/96; H04N 19/14;
(Continued)

(56) References Cited

U.S. PATENT DOCUMENTS 5,598,484 A * 1/1997 Suzuki ................ H04N 19/176
358/1.9
5,754,698 A * 5/1998 Suzuki .................... H04N 7/54
375/E7.026
(Continued)

FOREIGN PATENT DOCUMENTS

CN 1209934 A 3/1999
CN 101771868 A 7/2010
(Continued)

OTHER PUBLICATIONS

Bross, B. et al., "High Efficiency Video Coding (HEVC) text specification draft 10 (for FDIS & Last Call)," Joint Collaborative Team on Video Coding (JCT-VC) 12th Meeting: Geneva, JCTVC-L1003_v3, Mar. 19, 2013, 7 pages.

(Continued)

*Primary Examiner* — Zaihan Jiang
(74) *Attorney, Agent, or Firm* — Slater Matsil, LLP

(57) ABSTRACT

An apparatus adapted, including a media encoder coupled to a data interface adapted to receive a frame or portion thereof. The media encoder is adapted to iteratively subdivide each block of a plurality of blocks partitioned in a frame or portion thereof and to process a subdivided block of the plurality of blocks, during each iteration of a plurality of iterations, by selecting a rotational symmetry mask fulfilling an efficiency measure for coding said block, the rotational symmetry mask selected from a plurality of rotational symmetry masks which define a plurality of different rotational symmetries in a multidimensional space, splitting the subdivided block to two complementary portions based on the rotational symmetry mask, generating a pair of rotational symmetry blocks each having one of said two complementary portions, and computing a plurality of transform coefficients from the pair of rotational symmetry blocks.

21 Claims, 28 Drawing Sheets

(51) Int. Cl.
*G06T 3/60* (2006.01)
*H04N 19/176* (2014.01)
*H04N 19/196* (2014.01)
*H04N 19/96* (2014.01)
*H04N 19/14* (2014.01)
*H04N 19/60* (2014.01)
*H04N 19/146* (2014.01)
*H04N 19/156* (2014.01)
*H04N 19/157* (2014.01)
*H04N 19/102* (2014.01)
*H04N 19/129* (2014.01)

(52) U.S. Cl.
CPC ......... *H04N 19/176* (2014.11); *H04N 19/196* (2014.11); *H04N 19/649* (2014.11); *H04N 19/96* (2014.11); *H04N 19/102* (2014.11); *H04N 19/129* (2014.11); *H04N 19/146* (2014.11); *H04N 19/156* (2014.11); *H04N 19/157* (2014.11)

(58) Field of Classification Search
CPC .. H04N 19/649; H04N 19/174; H04N 19/146; H04N 19/157; H04N 19/102; H04N 19/156; G06T 3/602
USPC ...................................................... 375/240.24
See application file for complete search history.

(56) References Cited

U.S. PATENT DOCUMENTS

| | | | | |
|---|---|---|---|---|
| 5,886,742 | A * | 3/1999 | Hibi ..................... | G06T 9/008 348/699 |
| 6,873,736 | B2 | 3/2005 | Okuno et al. | |
| 9,179,162 | B2 * | 11/2015 | Cook ..................... | H04N 19/21 |
| 2001/0033695 | A1 | 10/2001 | Okuno et al. | |
| 2002/0051488 | A1 * | 5/2002 | Li ............... | G06T 9/20 375/240 |
| 2002/0172398 | A1 * | 11/2002 | Hayashi .................. | G06T 1/005 382/100 |
| 2006/0115922 | A1 | 6/2006 | Araya et al. | |
| 2007/0263728 | A1 | 11/2007 | Yanagihara et al. | |
| 2008/0101707 | A1 | 5/2008 | Mukherjee et al. | |
| 2011/0097003 | A1 | 4/2011 | Alshina et al. | |
| 2011/0274176 | A1 | 11/2011 | Panusopone et al. | |
| 2012/0014587 | A1 | 1/2012 | Yamane | |
| 2012/0288210 | A1 * | 11/2012 | Chen ..................... | H04N 19/176 382/233 |
| 2014/0307780 | A1 | 10/2014 | Cohen et al. | |
| 2015/0110199 | A1 | 4/2015 | Ikai et al. | |
| 2015/0229948 | A1 * | 8/2015 | Puri ..................... | H04N 19/615 375/240.03 |
| 2016/0134874 | A1 * | 5/2016 | Konieczny ........... | H04N 19/597 375/240.08 |
| 2017/0201770 | A1 | 7/2017 | Chen et al. | |
| 2017/0251210 | A1 * | 8/2017 | Dvir ..................... | H04N 19/176 |
| 2017/0251227 | A1 * | 8/2017 | Dvir ..................... | H04N 19/176 |
| 2017/0280144 | A1 | 9/2017 | Dvir et al. | |
| 2018/0176559 | A1 * | 6/2018 | Lee ..................... | H04N 19/597 |
| 2018/0176560 | A1 * | 6/2018 | Mishurovskiy ...... | H04N 19/176 |
| 2018/0199060 | A1 | 7/2018 | Zheng | |

FOREIGN PATENT DOCUMENTS

| | | | |
|---|---|---|---|
| CN | 102215396 | A | 10/2011 |
| CN | 102339467 | A | 2/2012 |
| CN | 102640498 | A | 8/2012 |
| CN | 102763415 | A | 10/2012 |
| EP | 2509319 | A2 | 10/2012 |
| JP | H0646397 | A | 2/1994 |
| JP | H0787493 | A | 3/1995 |
| JP | 2003264833 | A | 9/2003 |
| JP | 2003299100 | A | 10/2003 |
| JP | 3502392 | B2 | 3/2004 |
| JP | 2004297416 | A | 10/2004 |
| JP | 2008109700 | A | 5/2008 |
| JP | 2010508706 | A | 3/2010 |
| JP | 2012089905 | A | 5/2012 |
| JP | 2013512627 | A | 4/2013 |
| KR | 19990082112 | A | 11/1999 |
| KR | 20120124058 | A | 11/2012 |
| KR | 20130025903 | A | 3/2013 |
| WO | 2011066672 | A1 | 6/2011 |
| WO | 2011088593 | A1 | 7/2011 |
| WO | 2011130186 | A2 | 10/2011 |
| WO | 2013068567 | A1 | 5/2013 |
| WO | 2013180023 | A1 | 12/2013 |
| WO | 2014109826 | A1 | 7/2014 |

OTHER PUBLICATIONS

Okubo, S. et al., H265/HEVC Textbook, Impress Japan Corporation, Ver. 1, Oct. 21, 2013, 11 pages (with partial translation).
Ding, Jian-Jiun et al., "Two-Dimensional Orthogonal DCT Expansion in Trapezoid and Triangular Blocks and Modified JPEG Image Compression," IEEE Transactions on Image Processing, vol. 22, No. 9, Sep. 2013, pp. 3664-3675.
Francois E., et al., "CE2: Simplified Geometry Block Partitioning", 4. JCT-VC Meeting; 95. MPEG Meeting; Jan. 20, 2011-Jan. 28, 2011; Daegu; (Joint Collaborative Team on Video Coding of ISO/IEC TC1/SC29/WG11and ITU-T SG.16 ); URL: http://wftp3.itu.int/av-arch/jctvc-site/,,No. JCTVC-D230, Jan. 15, 2011 (Jan. 15, 2011), XP030008270, ISSN: 0000-0013, The whole document.
International Telecommunication Union, "Advanced video coding of generic audiovisual services", Series H: Audiovisual and Multimedia Systems, Infrastructure of audiovisual services—Coding of moving video, Recommendation ITU-7, H.264, Feb. 2014, 790 pages.
International Telecommunication Union, "High efficiency video coding, Series H: Audiovisual and Multimedia Systems, Infrastructure of audiovisual services—Coding of moving video," Recommendation ITU-7, H.265, Oct. 2014, 540 pages.
McCann K., et al., "High Efficiency Video Coding (HEVC) Test Model 12 (HM 12) Encoder Description", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16 ); URL: http:/wftp3.itu.int/av-arch/jctvc-site/,,No. CTVC-N1002, Oct. 21, 2013 (Oct. 21, 2013), XP030114946, Chapter 3.2.3. 7 pages.
Sikora, Thomas et al., "Shape-Adaptive DCT for Generic Coding of Video," IEEE Transactions on Circuits and Systems for Video Technology, vol. 5, No. 1, Feb. 1995. pp. 59-62.
Sullivan, Gary J. et al., "Overview of the High Efficiency Video Coding (HEVC) Standard," IEEE Transactions on Circuits and Systems for Video Technology, vol. 22, No. 12, Dec. 2012, pp. 1649-1668.
Sullivan, Gary, et al., "Meeting report of the fourth meeting of the Joint Collaborative Team on Video Coding (JCT-VC)", Daegu, KR, Jan. 20-28, 2011, 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16 ); URL: http://wftp3.itu.int/av-arch/jctvc-site/,,No. JCTVC-D500, Apr. 15, 2011 (Apr. 15, 2011), XP030113312, Chapter 5.1.

* cited by examiner region A

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 32 | 31 | 30 | 29 | 28 | 27 | 26 | 25 |
| 24 | 23 | 22 | 21 | 20 | 19 | 18 | 17 |
| 16 | 15 | 14 | 13 | 12 | 11 | 10 | 9 |
| 8 | 7 | 6 | 5 | 4 | 3 | 2 | 1 |

502

504 region B

Fig. 5A

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 32 | 31 | 30 | 29 | 28 | 27 | 26 | 25 |
| 24 | 23 | 22 | 21 | 20 | 19 | 18 | 17 |
| 16 | 15 | 14 | 13 | 12 | 11 | 10 | 9 |
| 8 | 7 | 6 | 5 | 4 | 3 | 2 | 1 |

Fig. 5B

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 32 | 31 | 30 | 29 | 28 | 27 | 26 | 25 |
| 24 | 23 | 22 | 21 | 20 | 19 | 18 | 17 |
| 16 | 15 | 14 | 13 | 12 | 11 | 10 | 9 |
| 8 | 7 | 6 | 5 | 4 | 3 | 2 | 1 |

Fig. 5C

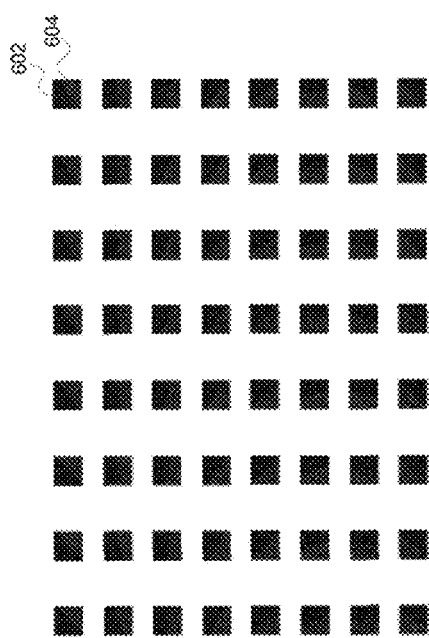
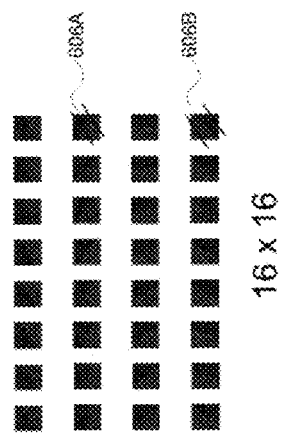
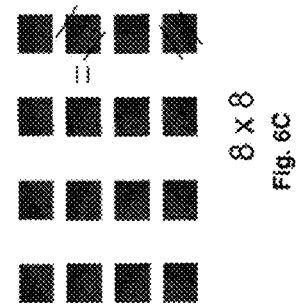
Fig. 6A
Fig. 6B 16 x 16
Fig. 6C 8 x 8

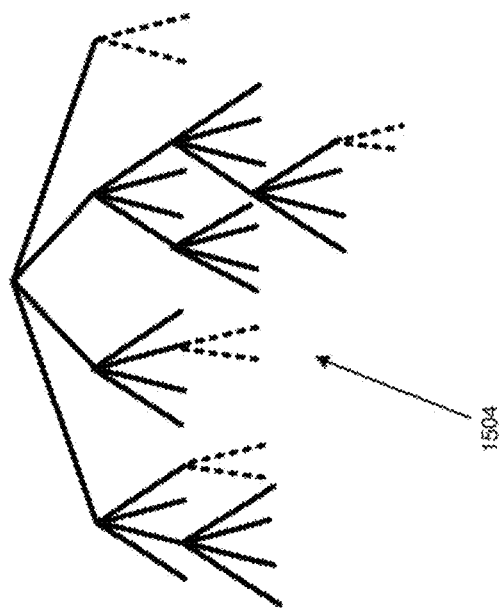
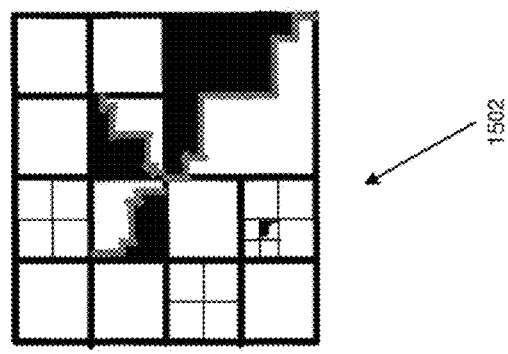
Fig. 15

| 1a | 0 3a → 3a 1b | 0 3b → 1b 8b | 0 | 3b | 0 |
|---|---|---|---|---|---|
| 0 9a | 6a | 0 8a | 8a 6b | 0 11b | 6b 16d | 0 | 8b |
| 3a 1c | 0 14a | 11a | 0 5b | 9b 14b | 0 14d | 11b | 0 |
| 0 9c | 14a 6c | 0 3c → 16a | 0 1d | 11d 14b | 0 | 16b |
| 16c 1c | 0 14c | 11c 3c | 0 8c | 1d 8d | 0 | 3d | 0 |
| 0 9d | 6c 6d | 0 3d | 16b 8c | 0 | 6d | 0 | 8d |
| 3c | 0 | 11c | 0 | 3d | 0 | 11d | 0 |
| 0 | 14c | 0 | 16c | 0 | 14d | 0 | 16d |

1st 4x4 Blk: (1,1), (1,3), (2,2), (3,1), (5,1), (4,2), (3,3), (2,4), (1,5), (1,7), (2,6), (3,5), (4,4), (5,3), (6,2), (7,1)

2nd 4x4 Blk: (2,8), (3,7), (4,6), (5,5), (6,4), (7,3), (8,2), (8,4), (7,5), (6,6), (5,7), (4,8), (6,8), (7,7), (8,6), (8,8)

Fig. 18C

SYSTEMS AND METHODS FOR PROCESSING A DIGITAL IMAGE

CROSS-REFERENCE TO RELATED APPLICATIONS

This application is a continuation of International Application No. PCT/EP2014/074638, filed on Nov. 14, 2014, the disclosure of which is hereby incorporated by reference in its entirety.

TECHNICAL FIELD

The present disclosure, in some embodiments thereof, relates to systems and methods for digital image and/or video compression and, more specifically, but not exclusively, to systems and methods for generating a set of transform coefficients for processing a block of a digital image.

BACKGROUND

Digital images, such as still images obtained by a digital camera, and digital video, require significant memory resources when stored in a non-compressed manner, represented by a full data set. Transmission of the full data set representing the digital images and/or video would require significant network resources, such as communication bandwidth. Video is especially problematic, as a single video may include thousands of individual frames. Storage and/or transmission of the full data set for each image may not be possible in many cases, or otherwise overwhelm processing and network resources.

Moreover, as quality and resolution capabilities improve in both cameras (still and video) and display screens, the amount of data generated per image continues to increase. Video based applications running on mobile devices (e.g., Smartphones and tablet computers) that rely on transmission of the video generate a large amount of network traffic, which is especially problematic for wireless networks.

Different solutions for compression of still digital images and digital video have been developed, to reduce the size of the image and video data, and thereby reduce the necessary storage resources and the network resources.

For example, Sullivan et al., "Overview of the High Efficiency Video Coding (HEVC) Standard" IEEE Transactions on Circuits and Systems for Video Technology Vol. 22, No. 12, December 2012 describe "High Efficiency Video Coding (HEVC) is currently being prepared as the newest video coding standard of the ITU-T Video Coding Experts Group and the ISO/IEC Moving Picture Experts Group. The main goal of the HEVC standardization effort is to enable significantly improved compression performance relative to existing standards—in the range of 50% bit-rate reduction for equal perceptual video quality."

SUMMARY

The object of the present disclosure is to provide an improved video compression technology.

This object is achieved by the solution provided in the independent claims. Advantageous implementations are further defined in the respective dependent claims.

According to a first aspect, an apparatus adapted to generate a plurality of transform coefficients for coding a frame or portion thereof comprises: a media encoder coupled to a data interface adapted to receive a frame or portion thereof, the media encoder is adapted to iteratively subdivide each of a plurality of blocks partitioned in a frame or portion thereof, during each of a plurality of iterations a subdivided block of the plurality of blocks is processed by select a rotational symmetry mask fulfilling an efficiency measure for coding the block, the rotational symmetry mask being selected from a plurality of rotational symmetry masks which define a plurality of different rotational symmetries in a multi dimensional space having a size and a shape as the subdivided block, when the efficiency measure is fulfilled: split the subdivided block to two complementary portions based on the rotational symmetry mask, generate a pair of rotational symmetry blocks each having one of the two complementary portions, and compute a plurality of transform coefficients from the pair of rotational symmetry blocks.

According to a second aspect, a method for generating a plurality of transform coefficients for coding a frame or portion thereof, comprises: iteratively subdividing each of a plurality of blocks partitioned in a frame or portion thereof, during each of a plurality of iterations a subdivided block of the plurality of blocks is processed by: selecting a rotational symmetry mask having a size and a shape as the block and fulfilling an efficiency measure for coding the block; when the efficiency measure is fulfilled: split the subdivided block to two complementary portions based on the rotational symmetry mask, generate a pair of rotational symmetry blocks each having one of the two complementary portions, and compute at least one transform coefficient from at least one the pair of rotational symmetry blocks. The method can be adapted to operate an apparatus according to the first aspect.

According to a third aspect, a method for encoding a frame or portion thereof, comprises partitioning iteratively the frame or portion thereof to a plurality of blocks, iteratively subdividing each the plurality of blocks, during each iteration on a subdivided block of the plurality of blocks: selecting from a library comprising a plurality of different rotational symmetry masks a rotational symmetry mask fulfilling an efficiency measure when coding the subdivided block; using the rotational symmetry mask to split the subdivided block to two complementary portions based on the rotational symmetry mask; generating a pair of rotational symmetry blocks each having one of the two complementary portions; computing at least one transform coefficient from at least one of the pair of rotational symmetry blocks; quantizing the at least one transform coefficient; and coding the at least one transform coefficient to create an encoding of the frame or portion thereof. The method can be adapted to operate an apparatus according to the first aspect.

According to a fourth aspect, an apparatus adapted to decode a frame or portion thereof, comprises a media decoder coupled to a data interface adapted to receive a bitstream of at least one encoded transform coefficient representing an encoded frame or portion thereof, the media encoder is adapted to decode at least one transform coefficient from the bitstream; compute a plurality of pairs of rotational symmetry blocks based on inverse transform of the at least one decoded transform coefficient, each member of each pair of rotational symmetry blocks having one of two complementary portions, reconstruct a plurality of blocks from each of the two respective complementary portions based on a respective rotational symmetry mask; and combine the plurality of blocks into a frame or portion thereof. The apparatus can be adapted to decode one or more frames or a portion thereof encoded by an apparatus according to the first aspect.

According to a fifth aspect, method for decoding a frame or portion thereof based on a bitstream representing an encoded frame, comprises: receiving a bitstream of at least one encoded transform coefficient representing an encoded frame or portion thereof, decoding the at least one transform coefficient, computing a plurality of pairs of rotational symmetry blocks based on inverse transform of the at least one transform coefficient, each member of each pair of rotational symmetry blocks having one of two complementary portions, reconstructing a plurality of blocks from each of the two respective complementary portions based on a respective rotational symmetry mask; and combining the plurality of blocks into a frame or portion thereof. The method can be adapted to operate an apparatus according to the fourth aspect.

According to a sixth aspect a computer program is configured to perform a method according one of the preceding aspects when executed on a computer. The computer program can be configured for use by a media encoder, the program code can comprise: instructions for receiving a bitstream of at least encoded transform coefficient representing an encoded frame or portion thereof; instructions for decoding at least one transform coefficients from the bitstream; instructions for computing a plurality of pairs of rotational symmetry blocks based on inverse transform the at least one transform coefficient, each member of each pair of rotational symmetry blocks having one of two complementary portions, instructions for combining each of the two respective complementary portions into a plurality of blocks, based on a respective rotational symmetry mask, and instructions for combining the plurality of blocks into a frame or portion thereof.

For clarity, details of the encoding apparatus, encoding method, and/or encoding computer program product are described herein. For each described encoding function and/or structure, a corresponding decoding function and/or structure is implied. For brevity and clarity, the wording of the decoding functions and/or structural elements corresponding to the described encoding function and/or structural element are omitted. For clarify, the term media encoder also refers to the method and the computer program product. For example, the phrase the media encoder is adapted also means the method further comprises, and the computer program product further comprises instructions for.

All aspects provides for improved system performance.

In a first possible implementation of the apparatus according to the first aspect, when the efficient measure is fulfilled, the media encoder is adapted to add the pair of rotational symmetry blocks to a dataset comprising a plurality of pairs of rotational symmetry blocks generated from at least some of the plurality of blocks.

In a second possible implementation form of the apparatus according to the first aspect as such, or according to the preceding implementation form, the efficiency measure is not fulfilled, the media encoder iteratively subdivides the subdivided block to a plurality of additional subdivided blocks and repeat the iteratively subdividing for each of the plurality of additional subdivided blocks.

The efficiency measure provides for improved performance by iteratively subdividing the blocks when doing so improves system performance over splitting the blocks using the mask.

In a third possible implementation form of the apparatus according to the first aspect as such, or according to any of the preceding implementation forms, for iteratively subdividing each of a plurality of blocks, the media encoder is adapted to use a tree structure mapping the subdividing of each of the plurality of blocks to support the iteratively subdividing; and update the tree structure with the pair of rotational symmetry blocks by adding two leaves each representing a member of the pair of rotational symmetry blocks.

The tree structure is used by certain standards, which allows for integration of the media encoder into systems based on the certain standard, to improve performance of the system.

In a fourth possible implementation form of the apparatus according to the first aspect as such, or according to any of the preceding implementation forms, the media encoder is adapted to split the subdivided block when a depth of the subdivided block in the tree structure is above a predefined threshold.

In a fifth possible implementation form of the apparatus according to the first, aspect as such, or according to any of the preceding implementation forms, the media encoder is adapted to select the rotational symmetry mask from a rotational symmetry mask library comprising a plurality of different rotational symmetry masks.

The selection of the mask from a library (or mask subset) instead of from a larger set of candidate masks reduces the number of encoded bits which are used to signal to a decoder the selected mask, and/or reduce the computation complexity and/or the memory sources and/or processor resources.

In a sixth possible implementation form of the apparatus according to the first aspect as such, or according to any of the preceding implementation forms, the media encoder is further adapted to code each of the plurality of transform coefficients using a spatial predictor selected according to a respective the rotational symmetry mask used for generating a respective the pair of rotational symmetry blocks.

Selection of the predictor(s) may be more accurate and/or performed with less resources (or in less time) when guided by the selected mask and/or based on the respective complementary portion.

In a seventh possible implementation form of the apparatus according to the first aspect as such, or according to any of the preceding implementation forms, the media encoder is further adapted to independently code each rotational symmetry block using a certain respective spatial predictor, wherein each respective spatial predictor is selected according to each respective portion of the rotational symmetry block.

Each rotational symmetry block is more efficiently encoded when predictors are used. Encoding the pair of rotational symmetry blocks is more efficient than encoding the single block without splitting into the pair of rotational symmetry blocks.

In an eighth possible implementation form of the apparatus according to the first aspect as such, or according to the any of the preceding implementation forms, the media encoder is further adapted to independently code each rotational symmetry block using a certain respective motion vector, wherein each respective motion vector is selected according to each respective portion of the rotational symmetry block.

In a ninth possible implementation form of the apparatus according to the first as such, or according to any of the preceding implementation forms, the media encoder is further adapted to code each of the plurality of transform coefficients using an entropy context model selected according to a respective the rotational symmetry mask used for generating a respective the pair of rotational symmetry blocks.

Encoding using the entropy context model improves system efficiency and/or performance.

In a tenth possible implementation form of the apparatus according to the first aspect as such, or according to any of the preceding implementation forms, the media encoder is further adapted to code at least one transform coefficient using an entropy context model adapted to at least one of the pair of rotational symmetry blocks.

In an eleventh possible implementation form of the apparatus according to the first aspect as such, or according to any of the preceding implementation forms, the media encoder is further adapted to select the rotational symmetry mask from the rotational symmetry mask library based on at least one efficiency criterion.

In a twelfth possible implementation form of the apparatus according to the first aspect as such, or according to any of the preceding implementation forms aspect, the media encoder is further adapted to select the rotational symmetry mask library from a plurality of rotational symmetry mask libraries each defined for another size of the subdivided block.

In a thirteenth possible implementation form of the apparatus according to the first aspect as such, or according to any of the preceding implementation forms, the computing the plurality of transform coefficients is performed by two dimensional (2D) Discrete Cosine Transform (DCT).

In a fourteenth possible implementation form of the apparatus according to the first aspect as such, or according to any of the preceding implementation forms, the computing the plurality of transform coefficients is performed by two dimensional (2D) Discrete Sine Transform (DST).

In a fifteenth possible implementation form of the apparatus according to the first aspect as such, or according to the any of the preceding implementation, the media encoder is further adapted to perform according to moving picture experts group (MPEG) format at least one of the methods to: predict at least one of the two complementary portions of the block compute at least one of the plurality of transform coefficients of at least one of the rotational symmetry blocks, quantize at least one of the plurality of transform coefficients; and entropy code a plurality of the transform coefficients to create an encoding of the frame or portion thereof.

Adapting the media encoder to perform according to MPEG format improves coding efficiency of the images and/or video, which improves overall performance of the system, for example, by improving compression performance, by reducing processor resource requirements, transmitter/receiver requirements, and/or memory requirements. Integration of encoder within an MPEG based system allows for higher image quality, higher image resolution and/or a larger number of images to be processed using the same resources.

In a sixteenth possible implementation form of the apparatus according to the first aspect as such, or according to any of the preceding implementation forms, the media encoder is further adapted to code the plurality of transform coefficients using a plurality of different entropy coding models adapted to encode differently and selected based on a respective the rotational symmetry mask.

In a seventeenth possible implementation form of the apparatus according the preceding implementation form, the media encoder is further adapted to code the plurality of transform coefficients by scanning the plurality of transform coefficients while skipping a plurality of zeroed coefficients.

Skipping zeros improves system performance by allowing compression of the non-zero coefficients.

In an eighteenth possible implementation form of the apparatus according to the first aspect said media encoder is further adapted to code said plurality of transform coefficients by selecting a scanning pattern from a plurality of scanning patterns by matching to said rotational symmetry mask one of said plurality of scanning patterns.

Scanning patterns are selected to improve system performance.

Further the plurality of transform coefficients can be arranged in a matrix; wherein the media encoder is further adapted to code the plurality of transform coefficients by scanning the plurality of transform coefficients in a plurality of complementary scanning patterns; wherein each one of the plurality of complementary scanning patterns is performed from a first corner of the matrix to a second corner of the matrix.

In a twentieth possible implementation form of the apparatus according to the first aspects, the plurality of transform coefficients are arranged in a matrix; wherein the media encoder is further adapted to code the plurality of transform coefficients by scanning the plurality of transform coefficients according to a pattern repeated in a plurality of sub areas of the matrix.

The repeated pattern provides for compatibility with certain image and/or video compression standards.

In a twenty-first possible implementation form of the apparatus according to the first aspect, the media encoder is further adapted to code the plurality of transform coefficients by selecting a scanning pattern from a plurality of scanning patterns by matching to the rotational symmetry mask one of the plurality of scanning patterns.

Different masks result in different patterns of zero coefficients, which are efficiently scanned when the scanning pattern is based on the applied mask.

In a twenty-second possible implementation form of the apparatus according to the first aspect or according to the any of the preceding implementation forms of the first aspect, the media encoder is further adapted to code the plurality of transform coefficients by storing coordinates of a last transform coefficient in a dataset as part of the encoding.

The location of the last coefficient is compressed, improving system performance.

In a twenty-third possible implementation form of the apparatus according to the first aspect, or according to the any of the preceding implementation forms, the media encoder is further adapted to shift non-zero values of the plurality of transform coefficients according to the order of the coefficient scanning performed on a matrix in which the plurality of transform coefficients are arranged, to reduce the size of the location of the last transform coefficient.

The shifting of the non-zero values improves system performance by reducing the size of the location of the last transform coefficient.

In a twenty-fourth possible implementation form of the apparatus according to the first aspect as such, or according to the any of the preceding implementation forms of the first aspect, the media encoder is further adapted to subdivide the plurality of blocks to various numbers of subdivided blocks, forming different subdivided blocks in different sizes.

The block subdividing is based on a certain standard, which provides for integration of the media encoder with a system based on the certain standard, to further improve performance of the system.

In a twenty-fifth possible implementation form of the apparatus according to the first aspect as such, or according to the any of the preceding implementation forms of the first aspect, the data interface is further adapted to receive a bitstream of at least one transform coefficient representing an encoded frame or portion thereof; and the media encoder is further adapted to: decode the at least one transform coefficient; compute a plurality of pairs of rotational symmetry blocks based on inverse transform of the transform coefficients, each member of each pair of rotational symmetry blocks having one of two complementary portions; reconstruct a plurality of blocks from each of the two respective complementary portions based on the respective rotational symmetry mask; and combine the plurality of blocks into a frame or portion thereof.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIGS. 5A-5C are schematic diagrams depicting pixel 2D mirroring for defining the rotational symmetry masks, in accordance with some embodiments of the present disclosure;

FIGS. 6A-6C are some examples of rotational symmetry mask libraries, in accordance with some embodiments of the present disclosure;

FIG. 15, is another schematic depicting iterative sub-division of blocks based on a tree structure, in accordance with some embodiments of the present disclosure;

FIGS. 18A-18C are matrices depicting packing of the non-zero coefficients, in accordance with some embodiments of the present disclosure;

DETAILED DESCRIPTION OF ILLUSTRATIVE EMBODIMENTS

Figure 1:
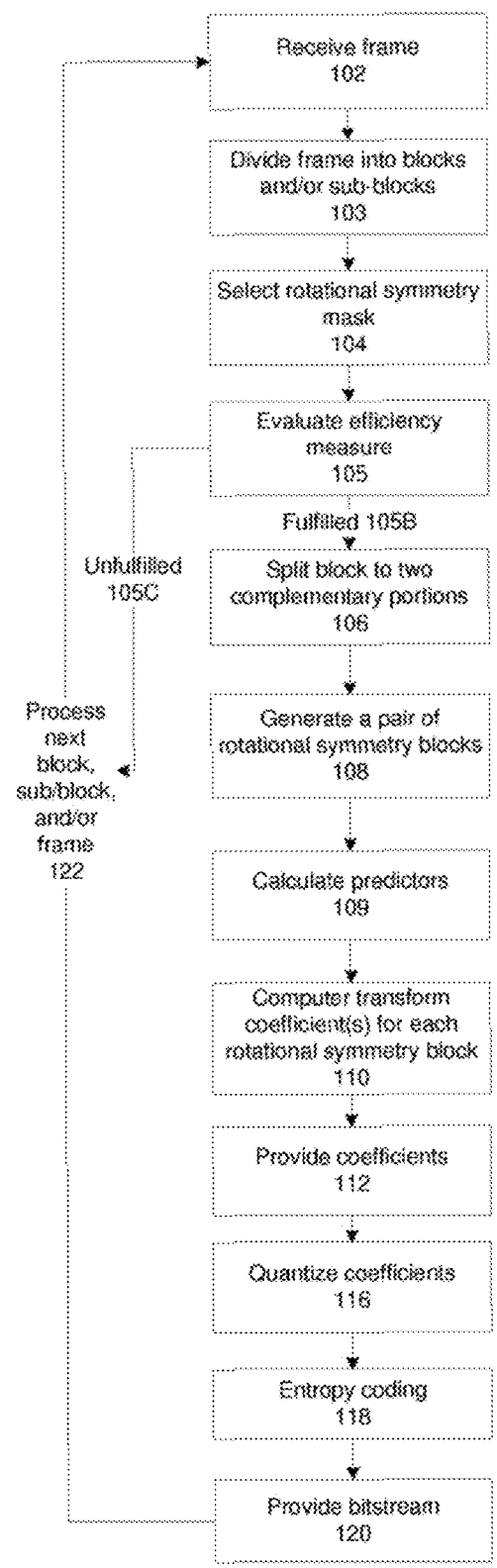
FIG. 1 is a flowchart of a method for generating a set of transform coefficients for coding and/or processing a block in a frame, in accordance with some embodiments of the present disclosure.

An aspect of some embodiments of the present disclosure relates to methods and/or systems for generating a set of transform coefficients for coding a block of a frame or portion thereof, the coding performed on two complementary portions obtained by splitting the block based on a certain selected rotational symmetry mask. The block of the frame is evaluated based on an efficiency measure to decide when to split and encode the block based on the systems and/or methods described herein, and when to continue processing of the block based on other image and/or video compression methods, for example, based on a standard. The methods and/or systems reduce the size (e.g., number of bits) required to store and/or transmit the block, by improving the compression rate of the block, without a significant reduction in image quality. Any image quality reduction is within predefined acceptable limits and/or similar to image quality reduction using standard methods without the method described herein, for example, peak signal to noise ratio (PSNR) may be used as an objective measure to define image quality. The efficiency measure may be evaluated to split (using the mask) and encode the block when the split is expected to improve performance over the standard based methods. When the efficiency measure is not fulfilled, the block may be processed in its entirety (e.g., based on the standard), or divided into sub-blocks, each of which is re-evaluated based on a respective efficiency measure. The efficiency measure provides for improved system performance (e.g., in terms of efficiency, memory resources, and/or processing resources) by splitting the blocks using the mask when doing so is expected to improve the system performance.

As described herein the term frame or image sometimes refers to a portion of the frame or a portion of the image. The transform coefficients may be calculated for the entire frame (and/or image), and/or for a portion of the frame (and/or image), for example, the transform coefficients are calculated for, sequence(s), slice(s), a minimum coded unit (MCU, e.g., as defined by JPEG or other standards), a block (e.g., as defined by HVEC or other standards) and/or tiles (e.g., sub-parts of the frame, for example, as defined by the compression HEVC or other standard). The frame or portion thereof being processed may be based on signals in the transmitted bit stream representing the selected mode.

Optionally, each block (or sub-block from a standard based block division) is independently evaluated based on the efficiency measure. In a frame (or portion thereof), some blocks may be encoded based on the systems and/or methods described herein, and other blocks may be encoded based on standard based compression methods, and/or other methods. The encoding of blocks based on the systems and/or methods described herein is integrated with other standard based image and/or video compression methods, to provide additional performance improvements over the standard (e.g., compression performance and/or resource utilization).

The methods and/or systems include an encoder for encoding the block, by selecting a suitable rotational symmetry mask for the block, splitting the block to two complementary portions based on the mask, generating a pair of rotational symmetry blocks from each of the portions, and computing transform coefficient(s) for one or both of the rotational symmetry blocks. The encoder may evaluate the block based on the efficiency measure.

The methods and/or systems include a decoder for decoding the transform coefficients and re-constructing the block. The transform coefficients are decoded to re-construct the pair of rotational symmetry blocks. Each member of the pair is converted back (for example, based on inverse transform calculations) to the respective one of the two complementary portions. The two complementary portions are connected back together to form the block, guided by the rotational symmetry mask.

For clarity, details of the encoder are described herein. For each described encoding function and/or structure, a corresponding decoding function and/or structure is implied. For brevity and clarity, the decoding functions and/or structural elements corresponding to the encoding function and/or structural element are omitted from the description.

Optionally, the mask is selected to split the block to two complementary portions that are better compressed as compared to a compression of the whole block, or as compared to compression of a standard splitting method for the block (e.g., four squares, for example, as defined the High Efficiency Video Coding (HEVC) and/or H.265 standards).

Optionally, the mask is selected to split the block based on one or more visual features within the image of the block. The block may contain different types of content separated by the visual features, for example, a tilted line or edge depicted across the block. The mask may split the block substantially along the visual feature to generate two complementary portions that are each more homogenous to one another (i.e., each generally depicting one of the types of content) than would be formed when the block is split at a location other than the visual features, for example, into four equal blocks as specified by the HEVC standard.

Optionally, different masks are selected for different blocks. The masks may be independently selected for the blocks, for example, based on the content within the block. Compression of each block is improved by the customized mask selection.

Each respective mask applied to each respective block is associated with the set of transform coefficients calculated for the respective block. For example, the mask used for each block is transmitted along with the calculated transform coefficients, and/or a signal indicating which mask (e.g., out of a library of possible masks) is associated with the transform coefficients is transmitted.

The mask has the property of being rotationally symmetric. Optionally, the mask defines the split of the block into two complementary portions such that the shape of the block and the split are invariant under 180 degree rotational of the block with respect to the center of the block. The mask may be a binary mask (as described herein). The rotational symmetry allows for calculation of orthogonal transformation coefficients in two dimensions using a suitable orthogonal transformation method, for example, a 2D discrete cosine transform (DCT). The orthogonal transformation coefficients are compressed more efficiently as compared to non-orthogonal transformation coefficients.

Each one of the two complementary portions retains the two dimensional topology of the original image content within the respective part of the block, allowing re-construction of the same image.

Optionally, each member of the pair of rotationally symmetry blocks is encoded using an independent spatial and/or temporal predictor. The independent predictor based encoding of each member may produce improved performance over predictor based encoding of the pre-split block in its entirety.

Optionally, transform coefficients calculated for each member of the pair of rotationally symmetry blocks are encoded based on a coefficient scanning method that skips the zeroed coefficients generated based on: (i) the rotational symmetry property obtained by certain sets of discrete orthogonal transforms; and (ii) the rotational symmetry concept applied to each one of the two complementary portions of the block. The coefficient scanning method may be selected based on the applied mask. The remaining un-skipped non-zero coefficients of each member of the pair may be entropy encoded based on an independent context model. Skipping the zero coefficients improves the coding performance, by removing the zero data.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
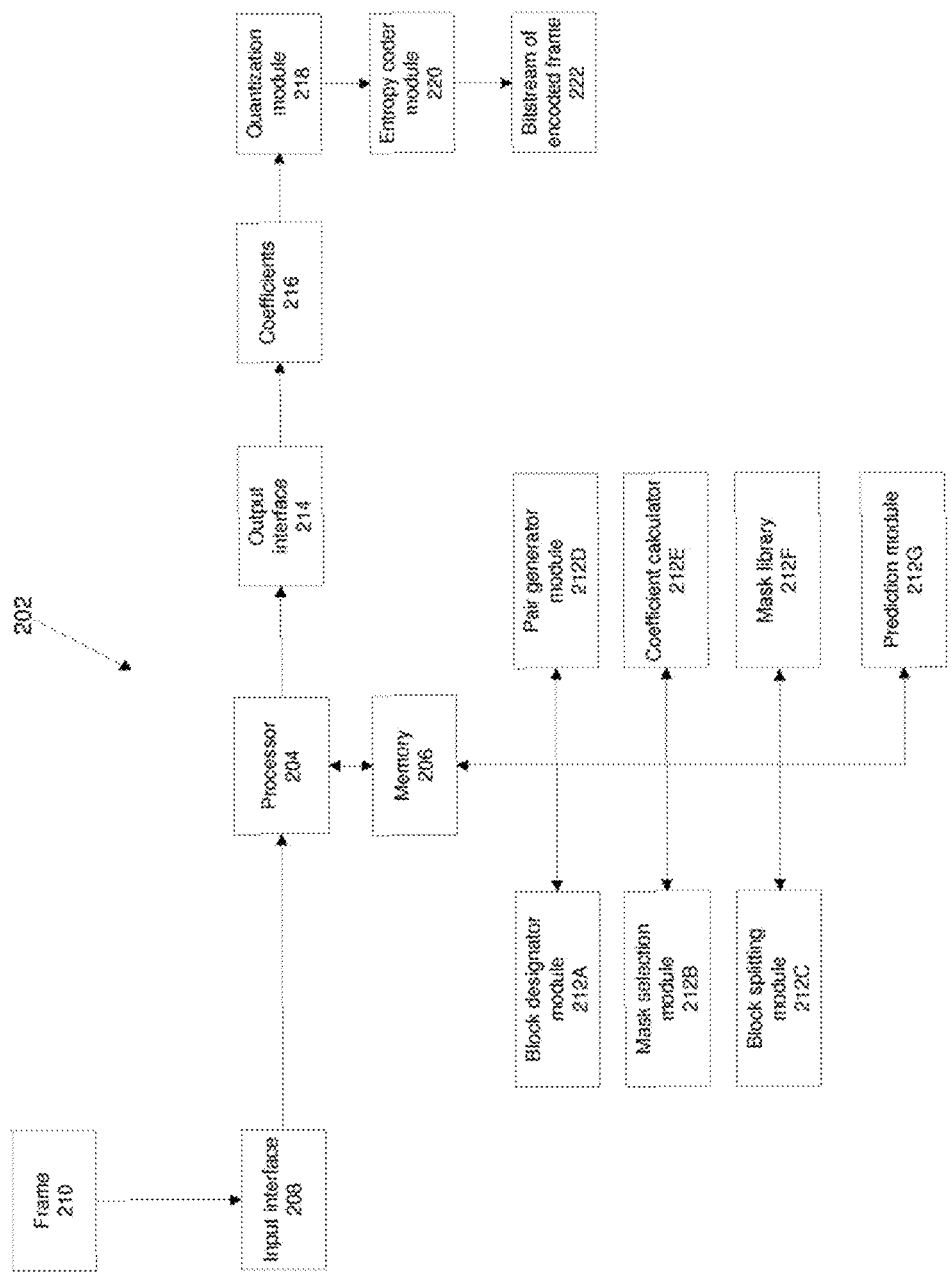
FIG. 2 is a block diagram of a media encoder adapted to generate a set of transform coefficients for coding and/or processing a block in a frame, in accordance with some embodiments of the present disclosure.

Reference is now made to FIG. 1, which is a flowchart of a method for generating a set of transform coefficients for coding a block in a frame, in accordance with some embodiments of the present disclosure. Reference will also be made to FIG. 2, which is a block diagram of a media encoder 202 adapted to generate a set of transform coefficients for coding a block in a frame, in accordance with some embodiments of the present disclosure. The media encoder of FIG. 2 is configured to perform one or more blocks of the method of FIG. 1. The method of FIG. 1 performed by the media encoder of FIG. 2 improve compression performance of digital images, in video and/or still format, without significantly lowering image quality, for example, as described with reference to FIGS. 12A-12I. It is noted that encoder 202 may serve as a coefficient decoder, in addition to, or instead of the described encoding functions. The decoding functions are based on the described encoding functions, but are omitted for clarity and brevity.

It is noted that in the interest of clarity and brevity, media encoder 202 is described with reference to elements and/or methods for calculation of the transform coefficients (as described herein). Media encoder 202 may include and/or be in communication with other encoding components, for example, image encoder/decoder 1004 of FIG. 10, and/or modules 218 and 220.

Media encoder 202 includes one or more processors 204 in communication with one or more memories 206 (or other types of computer readable storage media) storing program instructions for execution by processors 204. Memory 206 may store data for use during processing, as described herein. Media encoder 202 may be implemented as software modules implemented within existing image compression software programs, as a chip that is integrated with existing hardware for image compression, a separate box that plugs into existing devices to improve image compression, or any combinations thereof. Processors 204 may perform the steps of the method based on parallel processing techniques, a single processor may be used, and/or processor(s) may be remotely located. Parallel processing may be used for the various candidate masks in the predefined set of rotational symmetry masks to select the best mask for splitting the block. One or more of memories 206 may be remotely located.

Media encoder 202 improves system performance by improving efficiency and/or reducing resource requirements (e.g., memory and/or processor) for compression of images and/or video.

At 102, a frame and/or block is received. Media encoder 202 is coupled to an input data interface 208 adapted to receive a frame 210 and/or block(s) of the frame. Frame 210 may be received as a still digital image, or as part of a video including multiple frames. When frame 210 is received from the video, inter-image compression techniques may be applied, as described herein.

Media encoder 202 is adapted to designate a block partitioned in the frame. Optionally, a block designator module 212A contains program instructions for media encoder 202 to perform the designation as described herein.

The frame may be divided and/or partitioned into multiple blocks. The frame may be partitioned into multiple blocks, each block having the same size, for example, as defined by a standard such as Joint Photographic Experts Group (JPEG). Alternatively, the frame may be divided into sub-blocks that may have different sizes, for example, based on a video and/or still image standard, for example HEVC, and Moving Picture Experts Group (MPEG).

The blocks may have a standard size, for example, 64×64 pixels, 32×32 pixels, 16×16 pixels, 8×8 pixels, 4×4 pixels, or other sizes.

The blocks may be squares (L×L pixels) or rectangles (M×N pixels).

The blocks may represent luma and/or chroma data.

Optionally, 103, each block of the frame is subdivided into sub-blocks. The frame may be pre-partitioned into blocks, for example, based on a standard such as JPEG, MPEG, or HVEC. Each of the partitioned blocks (or sub-blocks) may be further iteratively divided into additional sub-blocks. The block subdividing is based on a certain standard, which provides for integration of the media encoder with a system based on the certain standard, to further improve performance of the system.

Block division may be performed by a block divider module 212G configured to perform the block division and/or decide on block division, as described herein.

The decision to sub-divide is based on fulfillment of an efficiency measure, as described with reference to block 105. The efficiency measure compares the efficiency of encoding the block based on the selected mask, split of the block, and encoding of the pair of rotational symmetry blocks, against the efficiency of encoding the sub-divided blocks. The efficiency measure directs the system for improved compression performance. The efficiency measure helps to decide when splitting the block with the mask is more efficient than iteratively subdividing the block. Applying the mask to the entire block is sometimes better (e.g., results in improved compression performance) than sub-dividing the block into sub-blocks (e.g., based on the quad tree structure). When sub-dividing the block, more bits may be spent to signal the structure, in comparison to the mask that is adapted to the whole block (which contains two parts) which may result in fewer transform coefficients (e.g., improved compression).

During each of the iterations, each subdivided block is processed based on block 104.

Alternatively or additionally, a decision is made to encode each entire block (or sub-divided block), or to apply the mask to the block (or sub-divided block).

The decision of whether to encode the entire block, sub-divided the block, or apply the mask and encode the pair of rotational symmetry block, may be based on the efficiency measure. The efficiency measure may be calculated or estimated for each case, with the decision made based on the encoding method producing the highest efficiency.

Figure 13:
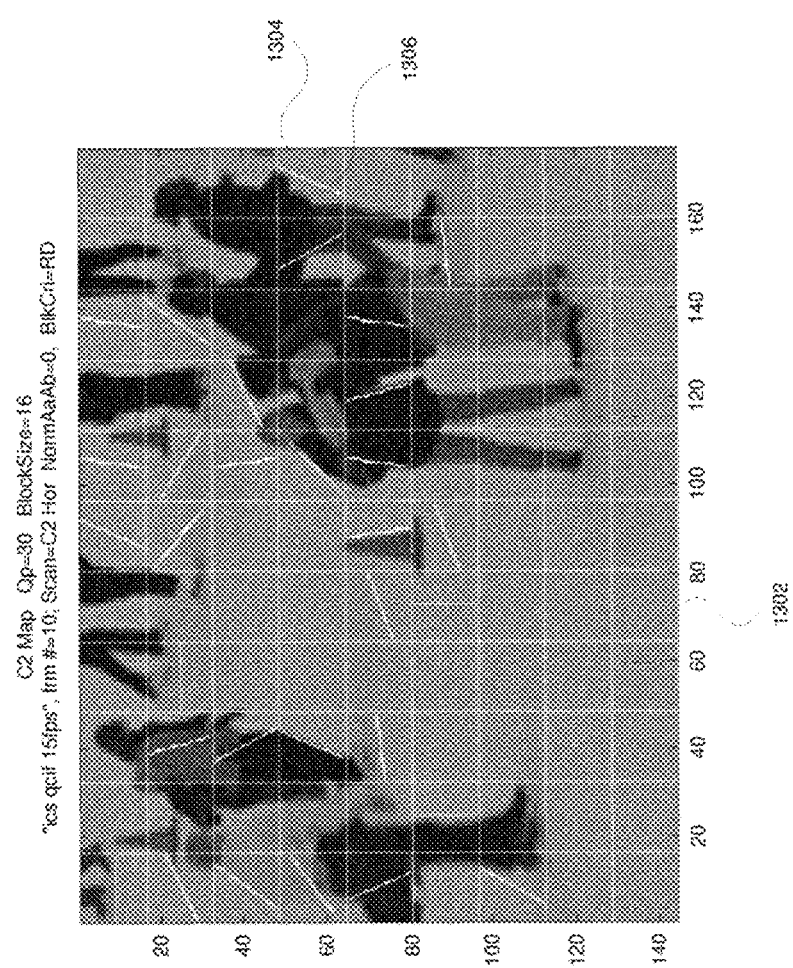
FIG. 13, is an example of an image having fixed sized blocks, in accordance with some embodiments of the present disclosure.

Reference is now made to FIG. 13, which is an example of an image having fixed sized blocks, for example, as defined by the JPEG standard, in accordance with some embodiments of the present disclosure. Each block may be encoded based on applying the selected mask and encoding the generated pair of rotational symmetry blocks. Alternatively, each block may be encoded in its entirety, for example, based the block encoding method defined by the JPEG standard. Block 1302 is an example of a 16×16 block encoded using standard based methods. Block 1304 is an example of a 16×16 block encoded based on application of a mask having a division line 1306, and encoding of the generated pair of rotational symmetry blocks.

Referring now back to FIG. 1, at 104, a rotational symmetrical mask is selected. A mask selector module 212B contains program instructions for media encoder 202 to perform the mask selection as described herein.

Optionally, the rotational symmetry mask has a rotational symmetry of order 2 (sometimes referred to herein as C2, denoting that the rotational symmetry holds for 360/2=180 degrees) with respect to the center of the block of the mask.

Figure 3:
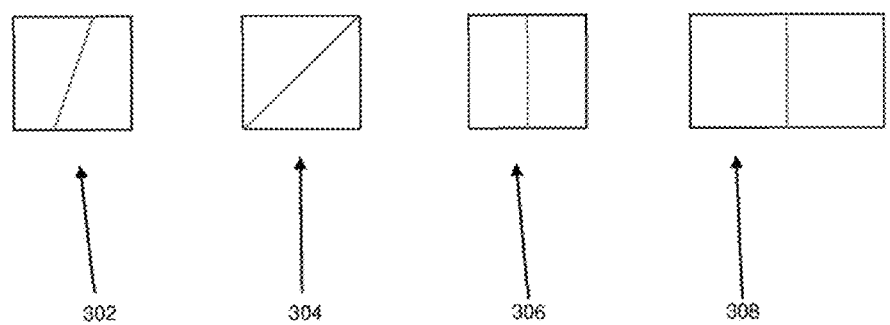
FIG. 3 is a schematic diagram depicting some examples of simple rotational symmetry masks, in accordance with some embodiments of the present disclosure.

Reference is now made to FIG. 3, which depicts schematic diagrams of some examples of rotational symmetry masks, in accordance with some embodiments of the present disclosure, for example, a right angle trapezoid 302, a right angle triangle 304, a rectangle 306 and a square 308.

Referring now back to FIG. 1, the media encoder is adapted to select a rotational symmetry mask for the designated block from multiple rotational symmetry masks which define multiple different rotational symmetries in a multi dimensional space having a size and a shape as the block.

Figure 4:
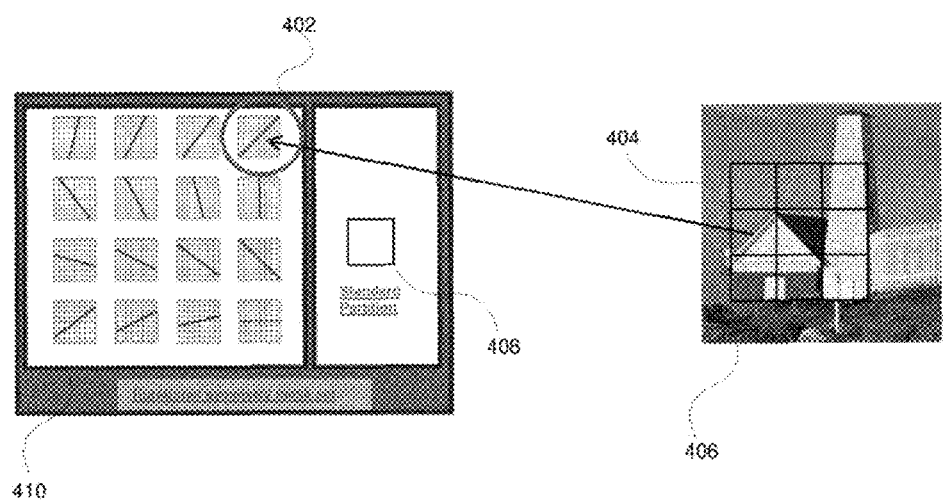
FIG. 4 is a schematic diagram depicting selection of a rotational symmetry mask for a block, in accordance with some embodiments of the present disclosure.

Reference is now made to FIG. 4, which is a schematic diagram depicting selection of a certain rotational symmetry mask 402 for a block 404 within a frame 406, in accordance with some embodiments of the present disclosure. Frame 406 contains an image of a house. Block 404 contains a portion of the roof of the house, and another portion of sky. Mask 402 is selected from a set of multiple available masks 410, based on certain compression preference measure (e.g., rate-distortion) and/or the visual feature boundary and/or edge that best separates the sky from the house. As apparent upon visual inspection of the non-selected masks, application of any of the other masks would result in more sky being contained within the roof portion, and more roof contained within the sky portion, as compared to using mask 402. Division of block 404 by mask 402 improves image compression as compared to compression of the entire block 404 by a standard partition 408 or by another mask.

Referring now back to FIG. 2, media encoder 202 is adapted to select the rotational symmetry mask from a rotational symmetry mask library comprising a multiple different rotational symmetry masks. The rotational symmetry mask may be selected from multiple masks stored in a rotational symmetry masks library 212F, optionally stored on memory 206 and stored on another computer readable storage medium in communication with processor 204.

Library 212F may store multiple different libraries of rotational symmetry masks. Each library may be based on a size and/or a shape of the block. For example, one library for masks of blocks of size 16×16 pixels, and another library for blocks of size 8×8 pixels.

Optionally, the different rotational symmetry masks are square masks (i.e., L×L pixels) having a size and a shape as the block. Alternatively, the different rotational symmetry masks are rectangular masks (i.e., M×N pixels) having a size and a shape as the block.

The rotational symmetry mask is adapted to define a line which joins opposing edges of a rectangle or square, to split a corresponding rectangular or square block to two 2D mirrored complementary portions. Different lines may be defined based on the two dimensional mirroring condition. The line may be linear or other forms, for example, stairstep or other arbitrary shapes. The line may be tilted at any angle or part thereof from 0 to 359 degrees. The 2D mirror property provides efficient compression of the block.

Reference is now made to FIGS. 5A-5C which are schematic diagrams depicting pixel 2D mirroring for defining the rotational symmetry masks, in accordance with some embodiments of the present disclosure.

FIG. 5A depicts the general 2D mirror concept. A block 502 of size 8 pixels by 8 pixels is shown for example purposes. Regions A and region B are separated by a virtual line 504 positioned horizontally through the middle of block 502. Pixels having the same number in region A and region B are 2D mirrors of one another. Pixel 2D mirroring may be generalized for an M×N rectangle: when pixel (m, n) is in region A, then pixel (M−1−m, N−1−n) is in region B.

It is understood that the 2D mirror concept may be applied to other square or rectangular blocks of different sizes. It is understood that the 2D mirror concept may be depicted for other virtual lines drawn at different tilts, for example, vertically, where region A and B are defined and separated by a virtual line positioned vertically through the middle of block 502.

Multiple different lines which join opposing edges of block 502 and cross the center point of block 502 are adapted to form a rotational symmetry mask library, as depicted in FIGS. 5B and 5C. Each individual line defines an individual mask. Each line splits block 502 into two complementary portions: region A and region B.

Optionally, the different rotational symmetry masks are defined by a respective matrix (e.g., each pixel position is represented by a location in the matrix). Each matrix defines a different separation of regions A and B, for example a line which joins opposing edges of the two dimensional space, to split the two dimensional space to two complementary portions.

It is noted that other dimensional spaces may be used, for example, three, four or more dimensions. The rotational symmetry mask is defined to split the respective multi-dimensional space, for example, a plane to split a three dimensional space.

It is noted that when the line goes through a location of a sample, there is no need for sub-sampling, since the full sample may be assigned to region A and be removed from region B. The computation resources (e.g., processor and/or memory) may be reduced by the addition to region A and removal from region B, instead of, for example, performing the complete set of calculations for each respective region.

Reference is now made to FIGS. 6A-6C, which are some examples of rotational symmetry mask libraries, in accordance with some embodiments of the present disclosure. FIG. 6A is an example of a library of masks for splitting a block of size 32×32 pixels. FIG. 6B is an example of a library of masks for splitting a block of size 16×16 pixels. FIG. 6C is an example of a library of masks for splitting a block of size 8×8.

The rotational symmetry mask libraries of FIGS. 6A-6C are based on a tilted line, which splits the block into two trapezoidal regions, represented by a dark region 602 of the mask (e.g., blue) and a light region (604) of the mask (e.g., red). Each mark in the library has a slightly different tilt of the line. Together, all the masks define all the different permutations of the tilted line within the block. Based on the tilted line cut, there are 2×(L−1) different ways to partition the square of size L×L.

In FIG. 6B, masks 606A and 606B have parallel lines through them, representing removal of masks 606A and 606B from the set of 32 masks, to form the set of 30 masks based on the equation in the previous paragraph. The two masks are doubles of existing masks due to mirror symmetry, and therefore may be removed from the generated set. Similarly, in FIG. 6C, two double masks are shown with parallel lines, representing the removal of the redundant masks from the set.

Optionally, each of the different rotational symmetry masks (which may be stored as one or more libraries) is mapped in a hierarchal arrangement. The hierarchal arrangement may reduce the processing time and/or resources to identify the best mask.

Each library may be independently mapped, the masks of each respective library may be mapped in the hierarchal arrangement. Alternatively, one or more libraries are mapped together based on the same hierarchal arrangement. The masks within each library are mapped based on the same common hierarchal arrangement.

The set of masks is divided into separate disjointed sections. The hierarchical arrangement may be according to an angle of the line in relation to an edge of the two dimensional space, for example, a hierarchal arrangement may map the lines of FIG. 6A-6C, for example, into group of 0-60 degrees, 61-120 degrees, and 121-180 degrees. The hierarchal arrangement may continue for mapping 181-240 degrees, 241-300 degrees, and 301-360 degrees, when the line is symmetrical and/or non-symmetrical. The hierarchal arrangement may be layered, for example, the group of 0-60 degrees is further sub-divided into the groups 0-15, 16-30, 31-45, and 46-60 degrees.

Figure 7:
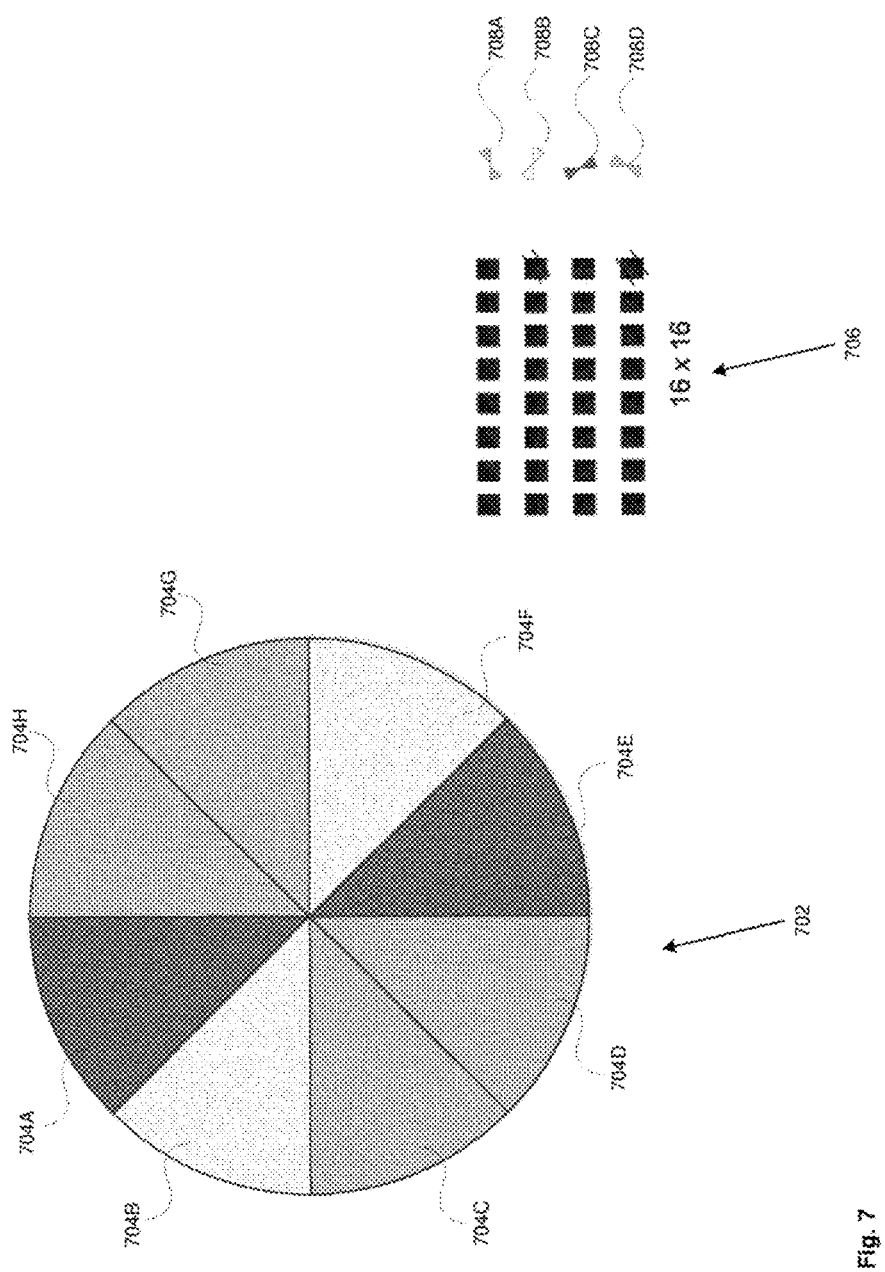
FIG. 7 is a schematic diagram that graphically depicts the hierarchal arrangement of rotational symmetry masks, in accordance with some embodiments of the present disclosure.

Reference is now made to FIG. 7 which is a schematic diagram that graphically depicts the hierarchal arrangement, in accordance with some embodiments of the present disclosure.

Divided circle 702 graphically depicts an example of a hierarchal arrangement for a mask library 706. Library 706 includes tilted line masks for a block of size 16×16, as described with reference to FIG. 6B. Circle 702 is divided into regions 704A-H, each representing 45 degrees of line tilt. The hierarchal arrangement is simplified due to the symmetrical nature of the tilted line masks, grouping together sectors 704A with 704E (shown as sectors 708C), 704B with 704F (shown as sectors 708B), 704C with 704G (shown as sectors 708A), and 704D with 704H (shown as sectors 708D). Each sector 708A-D includes 8 or 7 masks with line tilt angles falling within the respective angle range.

Optionally, the media encoder is adapted to select the rotational symmetry mask in an iterative mask selection of at least some of the different rotational symmetry masks in an order defined according to the hierarchal arrangement. For example, referring to FIG. 7, the search is performed among the 4 representative partitions 708A-D having a central angle defined by the equation 22.5+45 k, where k=0, 1, 2, 3, and a span of 45 degrees. The section may be selected based on a lowest cost calculated by a suitable function, for example, a minimum rate distortion measure. The mask within the selected section may be selected in a similar manner. When the hierarchal arrangement includes additional levels, the additional levels may be searched in an iterative manner until a mask is identified.

Figure 8:
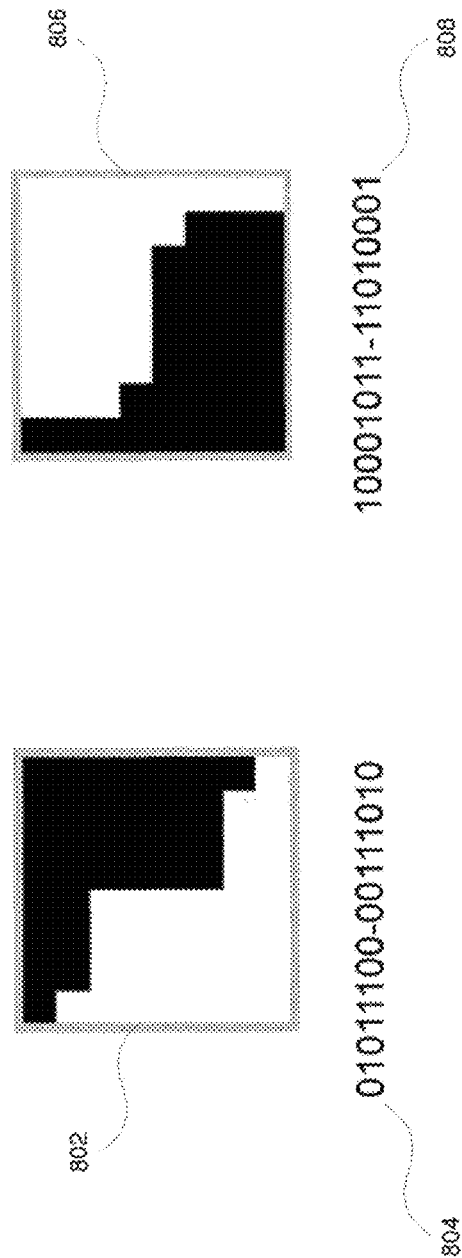
FIG. 8 is a schematic diagram depicting generation and/or representation of the rotational symmetry mask, in accordance with some embodiments of the present disclosure.

Reference is now made to FIG. 8, which is a schematic depicting generation and/or representation of the rotational symmetry mask, in accordance with some embodiments of the present disclosure. Optionally, a library of masks is generated, based on different permutations within the block containing the mask.

For example purposes, mask generation for blocks of size L×L is described, which may be extended to the M×N case. The mask may be generated starting from the upper left corner, proceeding towards the center of the block. The combination of movements may be 2D mirrored to obtain the remaining mask pattern from the center of the block to the bottom right.

The mask may be represented by a binary representation for each move. Each move is either horizontal (i.e., from left to right) or vertical (i.e., from top to bottom), represented by a 1 (e.g., one step to the right) or 0 (e.g., one step down). The binary mask representation may be transmitted as is, or be further compressed. The binary representation provides an efficient (i.e., in terms of processor and/or memory resource utilization) transmission of the mask, for example, from the encoder to the decoder.

Each permutation in the set may be defined by a total of 2×L moves.

Mask 802 is represented by binary pattern 804. Mask 806 is represented by binary pattern 808.

Figure 9:
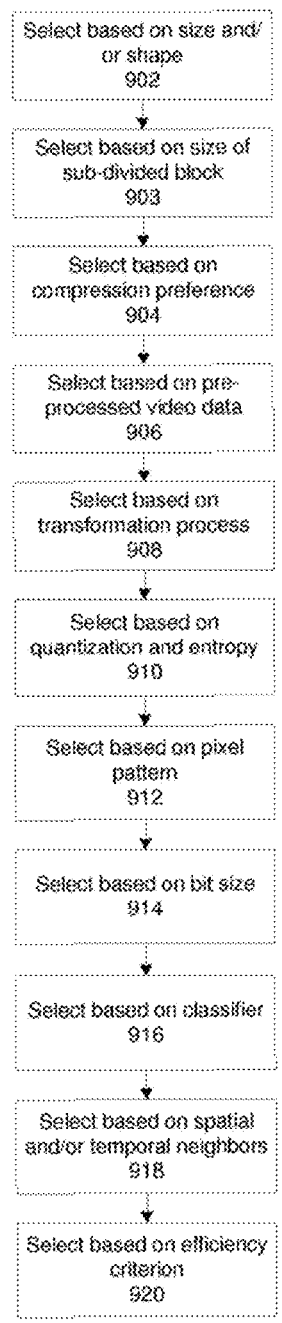
FIG. 9 is a list of varieties of computerized criteria and/or methods for selecting a rotational symmetry mask for splitting the block, in accordance with some embodiments of the present disclosure.

Reference is now made to FIG. 9, which is a list (e.g., flowchart) of computerized methods for selecting a rotational symmetry mask and/or mask library for splitting the block, in accordance with some embodiments of the present disclosure. The mask and/or mask library may be generated (e.g., in advance and/or dynamically) based on the blocks, instead of and/or in addition to being selected. Media encoder 202 is adapted to perform one or more blocks of the method. One or more blocks of the method may be performed for mask selection. Blocks may be performed in any order and/or simultaneously.

The one or more methods of selection described herein (executed sequentially and/or in parallel, optionally in combination) may be used as a basis for selection of a certain mask within a library of masks. Alternatively or additionally, the methods of selection may be used to first select a certain mask library out of multiple mask libraries, and/or a sub-set of masks out of the library. The certain mask may be selected out of the selected library and/or selected sub-set. The step-wise and/or hierarchical selection may reduce the search range, by reducing the size of the set for selection at each step, reducing resources and/or the computations for the selection.

The selection of the mask from a library (or mask subset) instead of from a larger set of candidate masks reduces the number of encoded bits which are used to signal to a decoder the selected mask, and/or reduce the computation complexity and/or the memory sources and/or processor resources.

Optionally, at 902, the library and/or the mask is selected based on the size and/or shape of the block. The mask may be selected from within the selected library as described herein.

Alternatively or additionally, at 903, the media encoder is further adapted to select the rotational symmetry mask and/or mask library from multiple rotational symmetry masks and/or mask libraries, each defined for another size of the subdivided block. During each iteration (as described with reference to arrow 105C), when the block (or sub-block) is further divided into other sub-blocks, the mask and/or mask library may be selected based on the new size of the divided sub-blocks. For example, the first mask library may be selected based on mask sizes corresponding to block sizes of 32×32 pixels. When the block is sub-divided into four sub-blocks, another mask library is selected based on the new sub-block sizes of 16×16. When one or more sub-blocks are yet divided again, yet another mask library is selected based on the new sub-block sizes of 8×8.

Alternatively or additionally, at 904, the media encoder is adapted to select the rotational mask and/or rotational symmetry mask library from multiple rotational symmetry masks and/or mask libraries based on compression preference for any one or more of, but not necessarily limited to, the following list: block, slice, tile, frame, and sequence.

The compression preference includes one or more parameters that define compression performance of the block when a certain mask is applied. The compression preference may be defined per mask and/or per mask library.

The compression preference may be estimated, for example, based on previously collected statistical data for the mask and/or library. Alternatively, the compression preference may be calculated, for example, by applying one or more of the candidate masks to the block.

Compression preferences may help in mask selection when compression parameters involve certain tradeoffs, for example, a decrease in size at the expense of decrease in quality.

The compression preference is selected from one or more of the following, individually or in combination:

Compression complexity preference: a measure that relates to processing resources for performing the compression based on the mask, for example, the number of computations, processor resources and/or memory resources. The measure may be dependent on the specific computer executing the method;

Compression quality preference (e.g., image distortion): compression based on the mask is a lossy operation, resulting in lower visual quality of the block. The lower quality may or may not be visually discernible by a human eye. The compression quality preference may be determined based on a measure related to the loss of information due to the compression based on the mask, for example, peak signal to noise ratio (PSNR) and/or structural similarity (SSIM); and Compression size preference: the size (e.g., number of bits) of the block after compression based on the selected mask.

Optionally, the media encoder is adapted to automatically generate the rotational symmetry mask library according to a member of a group consisting of preferences for: a block compression complexity, a block compression size, and a block compression quality. The generated mask library has known compression preference criteria, which allows for easy and/or fast selection of the library. The number of masks within the generated library may be smaller than generating all possible permutations, as only masks satisfying the compression criteria are included.

Each mask may be associated with the compression preference, for example, stored, matched, and/or tagged with the compression preference values. Each mask may be associated with one or more measures to calculate the compression complexity preference, the compression quality preference, and/or the compression size preference.

Optionally, each one of the different rotational symmetry masks is associated with an estimated complexity measure indicative of a computational complexity of applying the respective mask on an exemplary block having the size and the shape of the respective mask. Masks with lower estimated complexity measures are estimated to require fewer resources (e.g., processor and/or memory). Mask selection based on estimated outcome improves system efficiency and/or utilizes fewer resources.

Optionally, each one of the different rotational symmetry masks is associated with an estimated distortion measure indicative of a compression distortion level emanated from applying the respective mask on an exemplary block having the size and the shape of the respective mask. The estimated distortion measure helps in selecting the mask based on the lossy compression tradeoff, for example, to select the mask having visually indistinguishable compression distortion level that also produces higher compression of the image. Masks with lower estimated distortion measures are estimated to require fewer resources (e.g., processor and/or memory) while achieving the targeted compression distortion level.

Optionally, the media encoder is adapted to select a rotational symmetry mask based on compression preference for the block. Optionally, the compression preference is selected from one or more of: a compression complexity preference, a compression quality preference, and a compression size preference.

Alternatively or additionally, at 906, the mask selection is based on pre-processed video data that includes the received frame. The pre-processing of the video data may be performed by the media encoder, by another computer connected to the media encoder, or by another computer independent of the media encoder (e.g., remotely located). The pre-processed data may be transmitted to the media encoder independently of the frame, and/or with the frame (e.g., tagged to the frame).

The pre-processing may be based on one or more identified features of the content of the frames of the video, for example, statistical distribution of pixel patterns, edges, pixel intensity, and pixel colors. The video data may be pre-classified based on the pre-processing results. The classification may be based on the identified features for allowing selection of the mask and/or mask library. The pre-classified video data improves system performance, as the masks may be selected more efficiently and/or using less resources based on the classification.

Optionally, the media encoder is adapted to select the rotational symmetry mask and/or mask library from multiple candidate rotational symmetry masks and/or mask libraries, based on the classification of the video data. For example, the pre-processing may identify that the video contains frames having many straight lines, for example, images of houses, cars, or other artificial structures. The video data may be classified as containing straight lines. A mask library of straight lines (i.e., different angles) may be selected. In another example, the pre-processing may identify that the video contains frames having many curved lines, for example, images of tree, branches, and land terrain. The video data may be classified as containing curved lines. A mask library of curved lines (i.e., stairstep lines based on discretization of curves may be selected).

The pre-processing of content may provide information for encoding based on prediction, as described herein.

Optionally, the media encoder is adapted to automatically generate the rotational symmetry mask and/or mask library based on the preprocessed video data. The different rotational symmetry masks may be selected from the mask repository of different rotational symmetry masks according to one or more compression parameters: an outcome of the preprocessing for compression complexity preference, compression size preference and/or compression quality preference. The compression parameters may be pre-calculated from the video data.

The pre-processing of the video data may improve performance of the encoder. Resource heavy computations may be performed in advance, instead of during the compression. Data serving as the basis for mask selection may be ready, to allow for faster mask selection during the block compression process, instead of performing the mask selection calculation during the compression process.

Alternatively or additionally, at 908, the media encoder is adapted to select the rotational symmetry mask based on an outcome of a transformation process and/or an estimation of an outcome of a transformation process applied on the at least one of the two complementary portions. Mask selection based on outcome and/or estimated outcome improves system efficiency and/or utilizes fewer resources.

The outcome of transformation process may include the size (e.g., number and/or sum of absolute of transform coefficients which are above a certain threshold) of one or both of the complementary portions after the transformation process. The mask resulting in the smallest size of the portion after the transformation process may be selected. The size may be calculated for one or both portions, such as the sum of the size of both portions.

The estimation of an outcome of a transformation process may include the Sum of Absolute Difference (SAD) of the residual data which is the input to the transformation process.

The estimation of the outcome of a transformation process may include the sum of absolute of the first, the second, and/or the higher order derivatives along the horizontal and/or vertical directions of the residual data, The estimation may be based on values from previously encoded portions using the same mask.

The outcome of the transformation process may be estimated by a known transformation process, for example, the transformation process(es) defined by the compression standard.

Alternatively or additionally, at 910, the media encoder is adapted to select the rotational symmetry mask based on an outcome and/or an estimation of an outcome of a quantization process and/or an entropy coding process applied on the transform coefficients for at least one member of the pair of rotational symmetry blocks.

The mask resulting in the smallest size of the portion after the quantization and/or entropy coding process may be selected, for example, the number of non-zero coefficients after quantization, and/or the size in generated bits, respectively. The size may be calculated for one or both portions, such as the sum of the size of both portions.

The estimation may be based on values from previously quantized and/or entropy coded portions using the same mask.

Alternatively or additionally, at 912, the media encoder is adapted to select the rotational symmetry mask according to a pattern of pixel values in the block. The pattern of pixel values may be extracted from the block, for example, by image segmentation methods, such as methods for locating boundaries and/or edges, for example based on intensity thresholding, edge detection, or other suitable methods. The pattern of pixel value may include the direction of an identified line within the block, and/or a pattern of the line (or curve). The extracted pixel pattern may be matched to a certain symmetry mask, for example, based on a lowest cost function to identify the mask with the most similar pattern to the extracted pixel pattern, such as matching masks that have the same direction and/or pattern as the identified line of the block. Selection based on the pattern of pixel values produces two complementary portions in which pixels within each respective portion are similar to one another, for example, similar intensity and/or color.

For example, referring back to FIG. 4, the edge between the roof and the sky in block 404 is extracted based on an edge detection method. The detected edge is mapped to mask 402 based on a cost function. The pattern within mask 402 is the most similar pattern to the extracted edge, out of the mask library.

Alternatively or additionally, at 914, the rotational symmetry mask is selected based on an estimated rate measure indicative of a number of bits transmitted when the certain rotational mask is applied to an exemplary block having the size and/or shape of the block being processed. A lower number of bits represents a more efficient compression with the certain mask. Each one of the different rotational symmetry masks is associated with the estimated rate measure indicative of the number of bits transmitted when the mask is applied on an exemplary block having the size and the shape.

The rate measure may be stored with each mask, allowing for quick selection of the mask based on the estimated rate measure value. The rate measure may be calculated in advance for each mask, instead of being recalculated during run-time, thereby reducing the computations required for the selection. The rate measure may be calculated based on the exemplary block, which may be a predefined block based on an average (or other measure) of a previous sample of blocks. The exemplary block may be selected from a library of blocks based on a similarity to the block being processed, for example, based on a cost function.

Alternatively or additionally, at 916, the media encoder is adapted to select the rotational symmetry mask based on a statistical classifier. The statistical classifier is generated by an analysis of a training set logging outcomes of applying at least some of the different rotational symmetry masks. The outcomes (which may be weighted) may include, for example, compression performance metrics (e.g., size, complexity, quality), processor resource utilization, and memory utilization. The statistical classifier may improve selection of the mask based on prediction of a result that includes multiple different desired outcomes.

The training set may be obtained based on a history of actual frames that were processed by the system. Alternatively, the training set may be obtained based on a prediction of types of frames that will be processed, for example, a nature channel may train a classifier with nature videos.

Outcomes of the classification may be used as inputs to further train and update the classifier.

The statistical classifier may be trained based on supervised learning and/or unsupervised learning methods.

The classifier may be applied to the block itself, to classify pixels within the block into one of two groups. The two groups may be divided based upon the rotational symmetry constraint of the rotationally symmetry mask. The mask is selected to match the arrangement of the two groups within the block. Each portion of the two complementary portions produces from the split of the block using the mask includes pixels from the respective group.

Alternatively or additionally, at 918, the media encoder is adapted to select the rotational symmetry mask based on content extracted from spatial and/or temporal neighboring blocks of the block. The neighbors may be intra-image and/or inter-image blocks. Spatial blocks may be neighbors of the block in one or, several or all directions relative to the block. Temporal neighboring blocks may be from neighboring block in previous frames (e.g., earlier in time) and/or subsequent frames (e.g., later in time). Blocks may be direct neighbors, or located two or more blocks (or frames) away. Neighboring blocks containing similar pixel patterns used as predictors improve system performance and/or require fewer resources.

Optionally, the neighbors include previously processed blocks. The previously processed blocks may be used as predictors for selection of the mask for the block being currently processed. Optionally, the selection of the rotational symmetry mask is performed based on information associated with spatial and/or temporal neighboring blocks of the block. Optionally, the information associated with the spatial and/or temporal neighboring blocks is related to prediction. For example, the information may include data to reduce the difference between the current block being processed and one or more of the neighbors, with redundant information being left out. The mask may be selected based on the difference data.

Optionally, the content extracted is according to a pattern of pixel values in the spatial and/or temporal neighboring blocks. The pixel pattern of the neighboring block may act as a predictor for selection of the mask in the currently block. For example, the pixel pattern includes a boundary and/or edge between a roof and sky (as discussed with reference to FIG. 4). The edge between the roof and the sky continues across several neighboring blocks. Encoding based on predictors improves system efficiency and/or utilizes fewer resources.

Alternatively or additionally, at 920, the media encoder is further adapted to select the rotational symmetry mask from the rotational symmetry mask library based on at least one efficiency criterion. The rotational symmetry is selected based on the improvement in system performance for the block being processed, achieved by selecting the mask over other masks. Details of the efficiency criterion are described with reference to block 105.

Referring now back to FIG. 1, at 105, the efficiency measure is evaluated for the block (or sub-block) when the selected symmetry mask is applied to transform the block (or sub-block). Alternatively or additionally, the certain mask is selected from a library of masks based on one or more criteria of the efficiency measure.

The efficiency measure may include calculations to obtain actual results, and/or estimation of the results. The calculations and/or estimates may be performed to evaluate the effect of applying the mask, or not applying the mask. When the mask is not applied, the calculations and/or estimates may be performed to evaluate the effects of encoding the block (or sub-block) as-is, or dividing the block (or sub-block) into additional blocks. The efficiency measure may be calculated for each block independently, or as a combination of performance of all sub-blocks of a divided block.

The efficiency measure may include the number of encoding bits of the compressed block, based on standard or non-standard measures. The actual results may be calculated by activating the entire coding channel (or part thereof), including one or more components performing the functions of transformation, quantization, and entropy coding. The coding channel may compute the encoded bits for the sub-block with the applied mask and/or without the applied mask, to compare the relative performances. The coding channel may compute the encoded bits for the sub-block with different masks to compare the performance of each mask. Activation of the coding channel provides exact efficiency measure values, with the trade-off of occupying the coding channel resources.

The efficiency measure may include the compression parameters as described herein, for example, with reference to block 904 of FIG. 9.

Optionally, at arrow 105B, when the efficiency measure is fulfilled, processing of the block continues as described with reference to block 106. Fulfillment of the efficiency measure indicates that the block is expected to have improved compression performance (as described herein) when split by the mask and each member of the pair of rotational symmetry blocks is encoded, as compared to encoding of the entire block without application of the mask.

Alternatively, at arrow 105C, when the efficiency measure is not fulfilled, the media encoder may follow the standard (e.g., HEVC) method by encoding the block as a whole block and/or iteratively subdividing the subdivided block to multiple additional subdivided blocks, for example, as described with reference to 122. Optionally, the media encoder repeats the iterative subdividing for each of the multiple additional subdivided blocks, based on block 103.

The iterative block sub-division may be based on a tree structure, for example, a quad tree structure as defined by MPEG and/or HVEC standard. The tree structure is used by certain standards, which allows for integration of the media encoder into systems based on the certain standard, to improve performance of the system.

Optionally, the media encoder is adapted to use a tree structure mapping the subdividing of each of the blocks to support the iterative subdividing process. The tree structure may be updated with the pair of rotational symmetry blocks by adding two leaves each representing a member of the pair of rotational symmetry blocks, for example, as shown with respect to FIGS. 14 and 15 described below.

Optionally, the level of the tree (i.e., sub-block size) to which masks may be applied for encoding of the blocks is selected and/or controlled. Optionally, the media encoder is adapted to split the subdivided block when a depth of the subdivided block in the tree structure is above a predefined threshold. The sub-division iterations continue until a suitable mask is identified for the respective block, or until a minimum size sub-block size threshold is reached, for example, 4×4 or 8×8 pixels. The minimum size threshold may be defined by an image and/or video compression standard.

Figure 14:
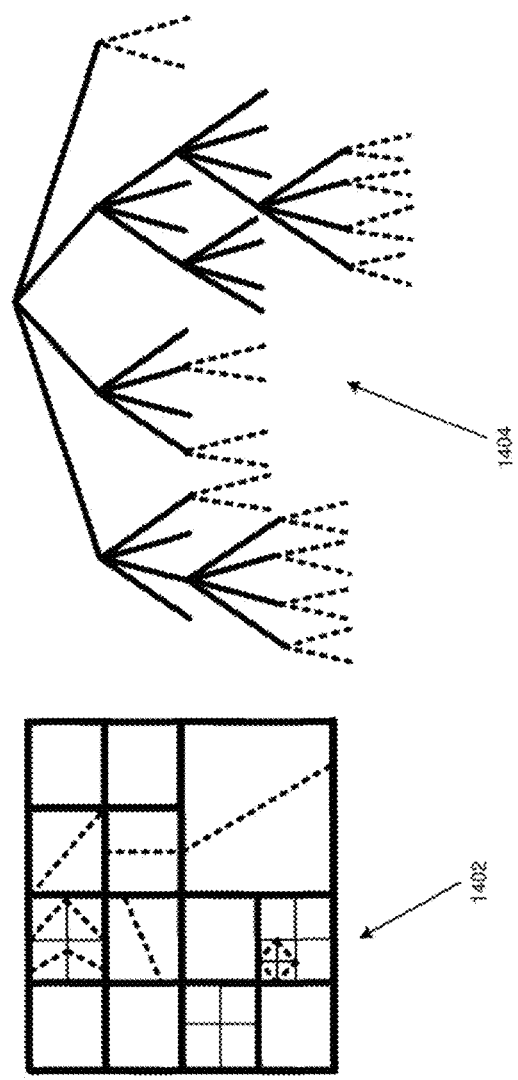
FIG. 14, is a schematic depicting iterative sub-division of blocks based on a tree structure, in accordance with some embodiments of the present disclosure.

Optionally, the media encoder is further adapted to subdivide the blocks to various numbers of subdivided blocks, forming different subdivided blocks in different sizes, for example, as shown with reference to FIG. 14 and FIG. 15.

Reference is now made to FIG. 14, which is a schematic depicting iterative sub-division of blocks based on a tree structure, in accordance with some embodiments of the present disclosure. Block 1402 is a frame, or a block partition of a frame. Block 1402 has been sub-divided into four sub-blocks. Some sub-blocks have been further divided into four additional sub-blocks. Different subdivided blocks of different sizes are formed. Certain sub-blocks are processed by application of the selected mask. A linear tilted dotted line pattern depicts the mask split line. Other sub-blocks are coded in their entirety, depicted by the absence of the dotted line.

Tree 1404 represents the iterative sub-division of block 1402. A group of four branches of tree 1404 represent the sub-division of the block into four sub-blocks. Iterative division of sub-blocks into four additional sub-blocks is depicted respectively by another group of four branches. Leaves represent the final stage of the sub-block division. Sub-blocks that are further split by the mask into two complementary portions that processed as a pair of rotational symmetry blocks are depicted as two dotted line leaves.

Reference is now made to FIG. 15, which is another schematic depicting iterative sub-division of blocks based on a tree structure, in accordance with some embodiments of the present disclosure. Block 1502 is similar to the described block 1402 of FIG. 14, except for application of masks from a mask library including stairstep cut lines. Sub-blocks split with the stairstep masks are represented by mirror portions, one of which is blacked in. Tree 1504 is similar to the described tree 1504 of FIG. 15. Sub-blocks split by the stairstep mask are represented as two dotted line leaves.

Referring now back to FIG. 1, at 106, the block is split to two complementary portions based on the rotational symmetry mask. Optionally, a block splitter module 212C contains program instructions for media encoder 202 to perform the block splitting as described herein.

At 108, a pair of rotational symmetry blocks, each having one of the two complementary portions is generated. Optionally, a pair generator module 212D contains program instructions for media encoder 202 to perform the pair generation as described herein.

The media encoder is adapted to generate each member of the pair of rotational symmetry blocks based on one of the two complementary portions and another portion added to form a block having a size and/or shape of the block.

Optionally, the added portion is a 2D mirror of the portion, which the rotational symmetry block is constructed from.

Optionally, the added portion is a 2D mirror of the portion from which the rotational symmetry block is constructed, but added with negative sign. In this case the rotational symmetry block contains two anti-symmetric portions.

Optionally, the added portion includes padding with a predefined sequence, for example, all zeros.

Optionally, the added portion is generated based on a 180 degree rotation of the portion, which the rotational symmetry block is constructed from.

Optionally, the dimension of the added portion is based on the dimension of the complementary portion, for example, two dimensional.

Each member of the generated pair of rotational symmetry blocks is represented by a matrix having values 2D mirrored around a main diagonal or other cut-line pattern based on the selected mask.

Optionally, the media encoder is adapted to add the pair of rotational symmetry blocks to a dataset comprising multiple pairs of rotational symmetry blocks generated from at least some of the blocks of the frame. The data set may include both rotational symmetry blocks, and the sub-blocks generated by the iterative division of larger blocks or sub-blocks that are processed in their entirety. Alternatively, the data set may contain only rotational symmetry blocks, with the sub-blocks being processed in their entirety separately stored in another data set. The dataset may be stored as a pair dataset repository 212H, adapted to store the pairs and/or standard blocks, as described herein.

Optionally, at 109, one or both of the pair of rotational symmetry blocks are processed for spatial prediction and/or temporal prediction, for example, by a prediction module 212G. Temporal prediction may be performed for inter-image coding. Optionally, in video encoding, prediction is performed based on a reconstructed image. The reconstructed image may be created by: the quantized coefficients undergoing inverse quantization, then inverse transformation, then deblock filtering. It is noted that block 109 may be partially or entirely executed after block 116 (i.e., based on the quantized coefficients), and/or after block 118, and/or at other locations in the encoding process.

Optionally, each member of the pair of rotational symmetry blocks is associated with a different spatial predictor. Alternatively, both members of the pair of rotational symmetry blocks are associated with the same spatial predictor.

Optionally, spatial prediction is performed for intra-image coding. Each or both members of the pair of rotational symmetry blocks may be coded based on intra-image prediction.

Optionally, the media encoder is adapted to code each of the transform coefficients (as described for example with reference to block 110) using a spatial predictor selected according to the respective rotational symmetry mask used for generating the respective pair of rotational symmetry blocks. Optionally, one or a set of the most probable predictors is selected based on the selected mask, for example, the direction mode as defined by the H.265 standard is selected based on the mask. Alternatively or additionally, the media encoder is adapted to independently code each rotational symmetry block (of the pair of blocks) using a certain respective spatial predictor. Each respective spatial predictor is selected according to each respective complementary portion. Boundary samples from spatially neighboring blocks used to form the prediction signal may be obtained based on the mask cut-line orientation and/or based on each respective complementary portion. As the mask has already been selected to divide the contents of the block into the two complementary portions, predictors for the content of each portion are expected to reside near each respective complementary portion. Selection of the predictors may be more accurate and/or performed with less resources (or in less time) when guided by the selected mask and/or based on the respective complementary portion. Each rotational symmetry block is more efficiently encoded when predictors are used. Encoding the pair of rotational symmetry blocks is more efficient than encoding the single block without splitting into the pair of rotational symmetry blocks.

Alternatively or additionally, spatial prediction is performed inter-image. Each or both members of the pair of rotational symmetry blocks may be coded based on inter-image prediction. Different motion vectors may be calculated for each respective member of the pair of rotational symmetry blocks, or the same motion vector may be used for the pair. The media encoder is adapted to independently code each rotational symmetry block using a certain respective motion vector. Each respective motion vector may be selected according to each respective complementary portion.

Figure 22A:
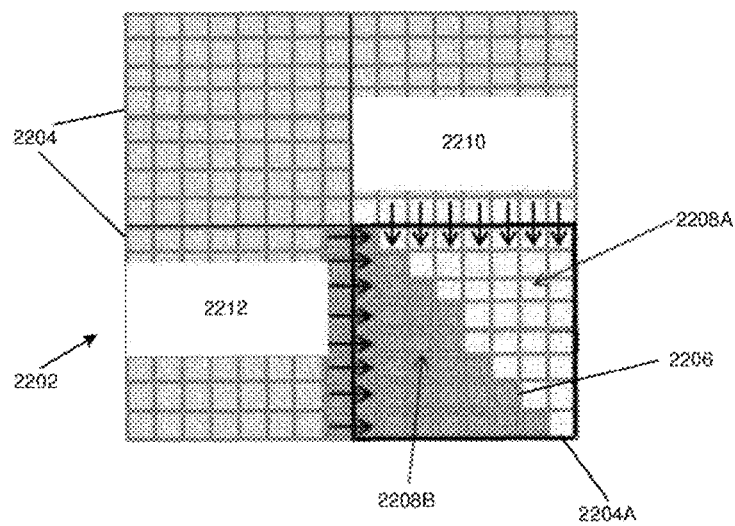
FIGS. 22A-B are schematics depicting spatial and/or temporal prediction, in accordance with some embodiments of the present disclosure.
Figure 22B:
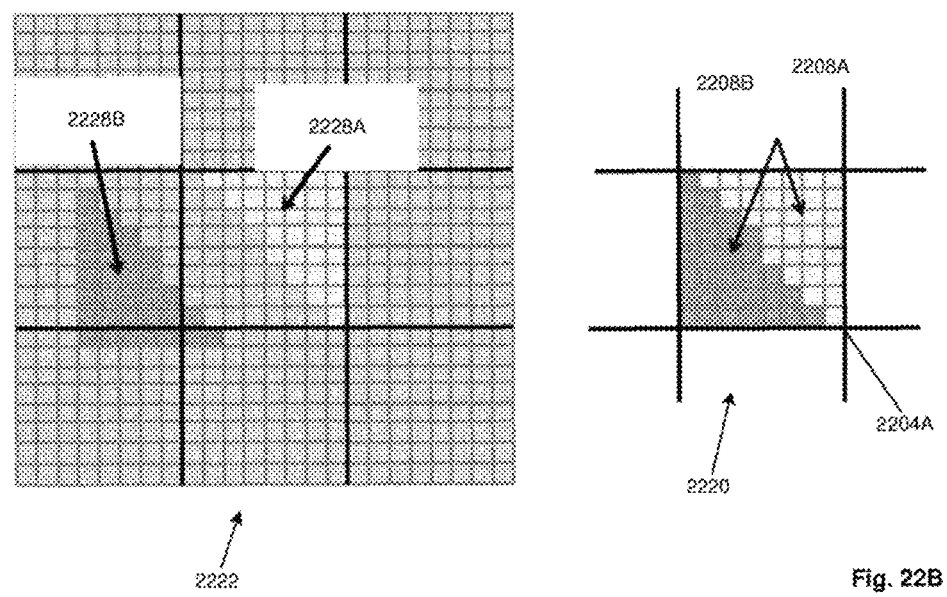

Reference is now made to FIGS. 22A-B, which are schematic diagrams depicting spatial and/or temporal prediction, in accordance with some embodiments of the present disclosure.

FIG. 22A depicts independent spatial intra-predictors for each rotational symmetry block and/or each one of the two complementary portions. Main block 2202 has been subdivided into four sub-blocks 2204. A mask having a diagonal cut line 2206 has been selected for a certain sub-block 2204A to split into an upper portion 2208A and a lower portion 2208B. Each member of the pair of rotational symmetry blocks (not shown for clarity) is calculated from a respective complementary portion. In this example, a vertical intra-predictor 2210 is selected for the upper portion 2208A and horizontal intra-predictor 2212 is selected for the lower portion 2208B.

FIG. 22B depicts independent temporal inter-predictors for each rotational symmetry block and/or each one of the two complementary portions. Block 2204A (as described with reference to FIG. 22A) is depicted in a current frame 2220 being processed. Frame 2222 is the reference frame for generating the predictors, such as the motion vectors. Portion 2228A of frame 2222 is selected as the prediction block for upper portion 2208A of block 2204A. The motion vector is represented as MVx=MVy=0. Portion 2228B of frame 2222 is selected as the prediction block for lower portion 2208B of block 2204A. The motion vector is represented as MVx=−5 and MVy=1.

The difference between each portion and the respective prediction (i.e., the respective residual) may be used as one of the two complementary portions to generate the respective rotational symmetry block, which then may be coded.

The residual may be calculated for one or more of: the temporal predictor, the spatial predictor, the intra-frame predictor, and the inter-frame predictor. It is noted that temporal predictions are based on inter frames data, and spatial predictions are based on intra frame data.

Referring now back to FIG. 1, at 110, one or more transform coefficients for one or both members of the pair of rotational symmetry blocks are computed. Optionally, transform coefficients are calculated for each one of the rotational symmetry blocks. Optionally, a coefficient calculation module 212E contains program instructions for media encoder 202 to perform the transform coefficient calculation as described herein.

Calculation of the transform coefficients may be performed based on one or more standard based calculation methods, based on one or more encoding techniques, and/or based on proprietary methods. An example of an encoding technique includes a two dimensional (2D) discrete cosine transform (DCT), which may be calculated, for example, based on two separable fast DCTs applied along each dimension, for example, when the rotational symmetry blocks are represented as matrices, the 2D-DCT may be calculated along the rows and then the columns, or along the columns and then along the rows. Other examples of transform methods include: 2D Discrete Sine Transform (DST), and other orthogonal and/or orthonormal transform scheme which maintain the 2D mirroring condition, for example:

$$T_{p,q}(M-m-1, N-n-1) = (-1)^{(p+q)} T_{p,q}(m,n),$$

where, $\{T_{p,q}(m,n)\}$ is the 2D transformation basis; (m,n) is the pixel location, m=0, 1, ..., M−1; n=0, 1, ..., N−1; p and q are the spatial frequencies: p=0, 1, ..., M−1; q=0, 1, ..., N−1; p+q is either even or odd for the symmetry and anti-symmetry case, respectively.

An example of a standard based encoding technique is the HEVC and/or H.265 standard for integer transform and/or inverse transform.

Optionally, an orthogonal transform set of coefficients is calculated for each one of the two complementary portions when the 2D mirrored portion is added with a negative sign (i.e. anti-symmetry). The set for the symmetrical and anti-symmetrical transform functions for calculation of the transform coefficients may be different. When computing the transform coefficients, the respective symmetrical or anti-symmetrical transform function is used.

Figure 16A:
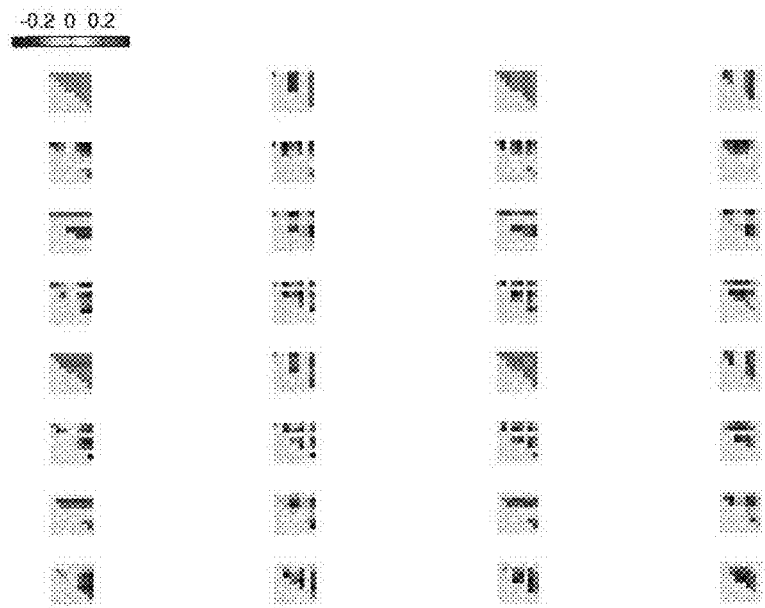
FIGS. 16A and 16B depict 2D DCT orthogonal matrices for the 8×8 rotational symmetry blocks generated from the upper and lower split portions, respectively, in accordance with some embodiments of the present disclosure.
Figure 16B:
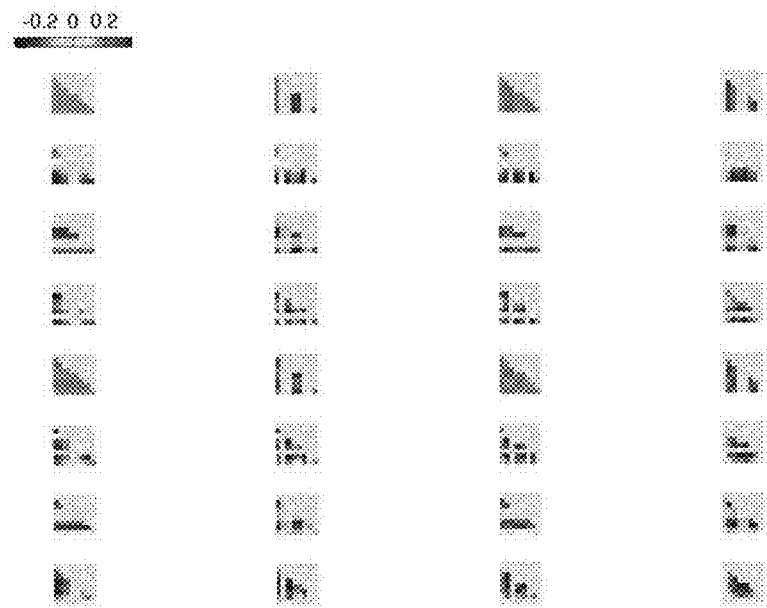

Reference is now made to FIGS. 16A and 16B, which depict 2D DCT orthonormal matrices for the 8×8 rotational symmetry blocks generated from the upper (FIG. 16A) and lower (FIG. 16B) split portions, in accordance with some embodiments of the present disclosure. The block has been split by applying a mask having a diagonal cut-line.

Orthonormality represents the property that an inner product is zero between each of the two matrices from the set, and has a value of one when calculated between each matrix and itself. The ij-th DCT coefficient is computed by an inner product of the ij-th 8×8 matrix and the 8×8 input block m where i=0, 1, ..., 7 and j=0, 1, ..., 7. For example, the DCT coefficient of the upper triangular block is computed using the upper-left matrix (i=0, j=0), which is actually summing over the upper right triangular of the input 8×8 block. Note that in each figure, the light (green) area is related to the non-relevant area of the rotational symmetry block.

Optionally, the media encoder is adapted to code the transform coefficient(s) using one or more spatial predictors adapted to the respective portion of the rotational symmetry mask. The transform may be calculated for the rotational symmetry block generated from the predictive block, for a predictive vector, for a predictive error, and/or for a predictive residual. The prediction residual may be calculated for temporal and/or spatial blocks (i.e., inter and/or intra-image blocks) based on the difference between the portion in the rotational symmetry block being processed and the corresponding prediction block.

Optionally, the media encoder is adapted to code the transform coefficient(s) using one or more temporal predictors adapted to the respective portion of the rotational symmetry mask. Alternatively or additionally, the media encoder is adapted to code the transform coefficient(s) of each of the rotational symmetry blocks using a spatial predictor related to the respective corresponding portion. Alternatively or additionally, the media encoder is adapted to code the transform coefficient(s) of each of the pair of rotational symmetry blocks using a motion vector related to the respective corresponding portion. The motion vector may be used to calculate the temporal prediction. Optionally, in video encoding, prediction is performed based on a reconstructed image. The reconstructed image may be created by: the quantized coefficients undergoing inverse quantization, then inverse transformation, then deblock filtering.

It is noted that the transform coefficients may be calculated based on one method for all transform coefficients, different methods for different transform coefficients (or sets of transform coefficients), and/or a combination of methods.

Optionally, the media encoder is adapted to code the transform coefficient(s) using an entropy context model adapted to the rotational symmetry mask. The entropy context model may be defined based on knowledge of the selected mask, to encode the transform coefficients with lossless data compression, for example, based on Huffman coding and/or arithmetic coding. As the entropy characteristics of the mask are known to the encoder in advance, a simpler code may be calculated.

The entropy context model may be a proprietarily designed model, and/or a standard based model, for example, the Context Adaptive Binary Arithmetic Coding (CABAC) scheme, such as CABAC of H.265/HEVC, H.264/MPEG-4, or other standards.

At 112, the calculated transform coefficients are provided for further processing, storage and/or transmission. Optionally, an output input interface 214 coupled to media encoder 202 is adapted to provide calculated transform coefficients 216, as described herein.

Optionally, at 114, blocks 102-112 are repeated for other blocks within the frame. Blocks 102-112 may be repeated for other frames. It is noted that blocks of a certain frame may be processed in parallel.

Optionally, at 116, the transform coefficients are quantized. The quantization may be performed by a quantization module 218, which may be based on an image and/or video compression standard, as described herein.

Optionally, at 118, the quantized coefficients are entropy coded to create an encoding of the frame or portion of the frame. Optionally, coefficient scanning is performed on the quantized transform coefficients and/or on the transform coefficients without quantization. The entropy coding may include the coefficient scanning.

Optionally, the media encoder is further adapted to code the quantized coefficients using one or more different entropy coding models adapted to encode differently. The entropy coding models are selected based on the respective rotational symmetry mask associated with the quantized transform coefficients.

The media encoder may be adapted to code each of the transform coefficients using an entropy context model selected according to the respective rotational symmetry mask used for generating the respective pair of rotational symmetry blocks. The media encoder may be adapted to code one or more transform coefficients using an entropy context model adapted to one or both members of the pair of rotational symmetry block. Encoding using the entropy context model improves system efficiency and/or performance. The coefficient scanning pattern as described herein may be selected based on the applied rotational symmetry mask and/or based on the rotational symmetry block.

The entropy encoding may be performed by an entropy coding module 220 configured to perform coefficient scanning and/or entropy encoding to generate a bit stream of the encoded frame (or portion thereof) 222, as described herein. Coding module 220 may be included as an element of encoder 202, residing on memory 206 or on an external memory in communication with encoder 202.

Optionally, the transform coefficients are arranged in a matrix. The coefficient scanning may be performed on the matrix form of the quantized transform coefficients, to reorder the coefficients into a linear array. The coefficient scanning may be performed as part of the process of entropy coding of the quantized transform coefficients, performing lossless compression on the quantized transform coefficients.

The coefficient scanning utilizes the property that 2D-DCT encoding of each member of the pair of rotational symmetry blocks generates zeroes for half of the coefficients. The total number of coefficients is M×N/2 (for an M×N block). The zero values are located on opposite diagonals, where for the M×N block (or L×L), $i+j$ is odd, $i=0, 1, 2, \ldots, M-1$; $j=0, 1, \ldots, N-1$.

Coefficient scanning may be performed by the transform coefficient calculation module 212E or another module, which may be further configured to perform the coefficient scanning as described herein.

Optionally, the media encoder is further adapted to code the quantized coefficients by scanning the transform coefficients while skipping the zeroed coefficients. Skipping zeroes improves system performance by allowing compression of the non-zero coefficients.

Optionally, the media encoder is further adapted to code the coefficients by scanning the transform coefficients in one or more complementary scanning patterns, for example, vertical, horizontal, and/or modified zig-zag. Alternatively or additionally, the scanning pattern is selected from multiple candidate scanning patterns by matching to the rotational symmetry mask one of the scanning patterns. For example, masks based on staircase and/or curved cut-lines (or other split patterns that composed of patterns more complex than a straight line) may generate zero values at locations corresponding to the certain mask pattern. The scanning pattern may be a complex pattern based on the selected mask. Scanning patterns are selected to improve system performance. Different masks result in different patterns of zero coefficients, which are efficiently scanned when the scanning pattern is based on the applied mask.

Each one of the complementary scanning patterns may be performed in a different frequency. Scanning may be performed for low frequencies and/or high frequencies, or based on other classifications. The coefficients may be sorted by frequency and divided approximately in half, into the low frequency coefficients and the high frequency coefficients.

Each one of the complementary scanning patterns may be performed from one corner of the matrix to another corner of the matrix. Alternatively, the scanning patterns may be split, and performed as different scanning patterns, for example, one pattern starting at the one corner, and a second pattern ending at the another corner.

The scan pattern may be repeated in multiple sub areas of the matrix. The sub areas of the matrix may be defined based on an image and/or video compression standard, for example, based on H.265 coefficient scanning is performed in 4×4 sub-areas for all block sizes. The repeated pattern provides for compatibility with certain image and/or video compression standards.

Each respective rotationally symmetry block of the pair of blocks may be associated with an independent context model for encoding the residual signals of the predictors, for example, as described herein. Each rotationally symmetry block of the pair includes up to ½ L×L non-zero coefficients instead of L×L coefficients, which may be independently encoded based on a selected coefficient scanning pattern.

Signals to the decoder representing the selected rotational symmetry mask may be entropy encoded based on an independent entropy context model.

Signals representing the type of predictor selected for prediction of each rotational symmetry block may be entropy encoded based on an independent entropy context model. Examples of types include: intra-frame prediction and/or inter-frame prediction. For intra-frame prediction, the same predictor for both rotational symmetry blocks, or independent predictors for each member of the pair of rotational symmetry blocks. For inter-frame prediction, independent motion vectors for each member of the pair of rotational symmetry blocks.

Signals representing the type of coefficient scanning that was selected for each rotational symmetry block may be entropy encoded based on an independent entropy context model. The type may include: when the coefficient scanning is dependent on the selected mask or independent of the selected mask. The type may include: one of the coefficient scanning methods described herein, or a standard defined coefficient scanning methods (e.g., vertical, horizontal, or modified zig-zag).

The media encoder may be adapted to code each of the transform coefficients of the residual signal of the predictors using an entropy context model selected according to the respective rotational symmetry mask used for generating the respective pair of rotational symmetry blocks. The media encoder may be adapted to code one or more transform coefficients of the residual signal using an entropy context model adapted to one or both members of the pair of rotational symmetry block.

At 120, the bit stream generated based on the coefficient scanning is provided. The bit stream may conform to constraints of an image and/or video compression standard, for example, HEVC. The bit stream may be stored, transmitted (e.g., to a remote server and/or remote client), and/or further processed.

Referring back to FIGS. 1 and 2, the method and/or system may be applied to encode images partitioned into uniform L×L block sizes, such as defined by an image compression standard, for example, JPEG. For each L×L block the following are performed based on FIG. 1:

At 104, the mask to split the block is selected among a predetermined set of masks.

At 105, the efficiency measure is evaluated for the block based on the selected mask. When the block is encoded more efficiently (as measured by the efficiency measure) by application of the mask to generate the pair of rotational symmetry blocks as compared to encoding of the L×L block in its entirety based on the standard, the encoder continues with the other parts of the method. Otherwise, the encoder encodes the L×L as a single rectangle as defined by the standard.

At 116, standard based methods for the 2D transformation, scaling and/or quantization are applied for each of the pair of rotational symmetry blocks.

At 118, the scanning method of the ½L×L coefficients may be fixed (e.g., V, H, and/or modified Zigzag), or according to the selected mask.

Each rotational symmetry block may have a separate associated intra predictor. Separate Entropy models may be used for the ½L×L non-zero coefficients and/or the rotational mask type.

Figure 17A:
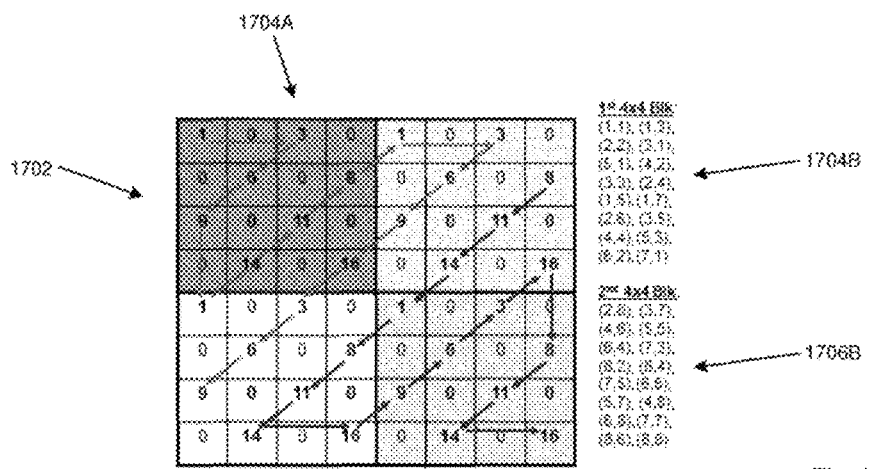
FIGS. 17A-D are examples of matrices containing quantized coefficients and zero value coefficients, and examples of some coefficient scanning patterns for coding of the quantized coefficients, in accordance with some embodiments of the present disclosure.
Figure 17B:
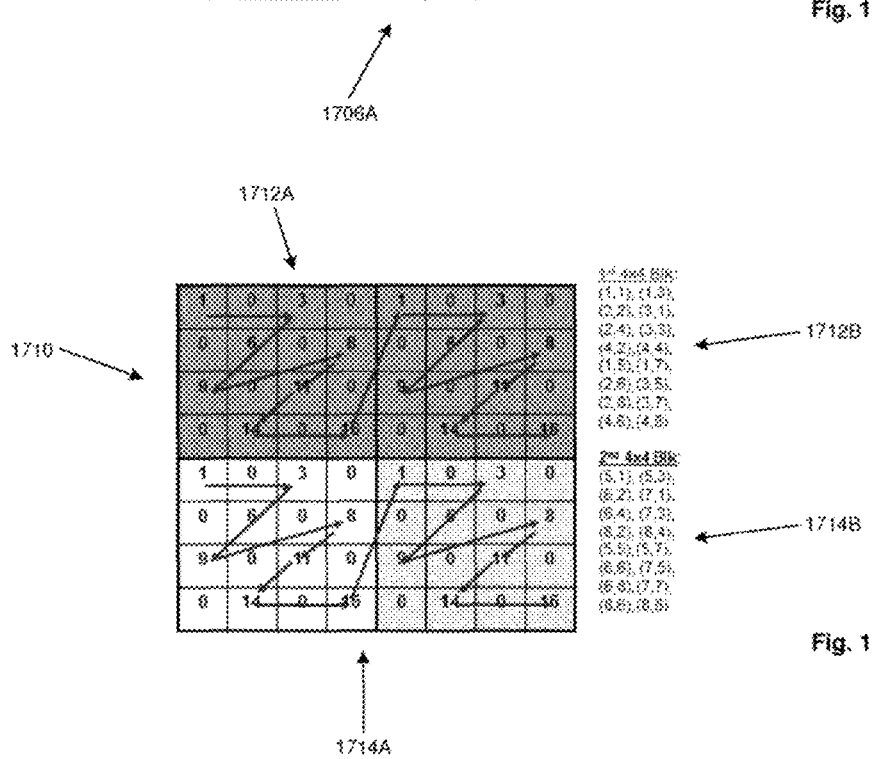
Figure 17C:
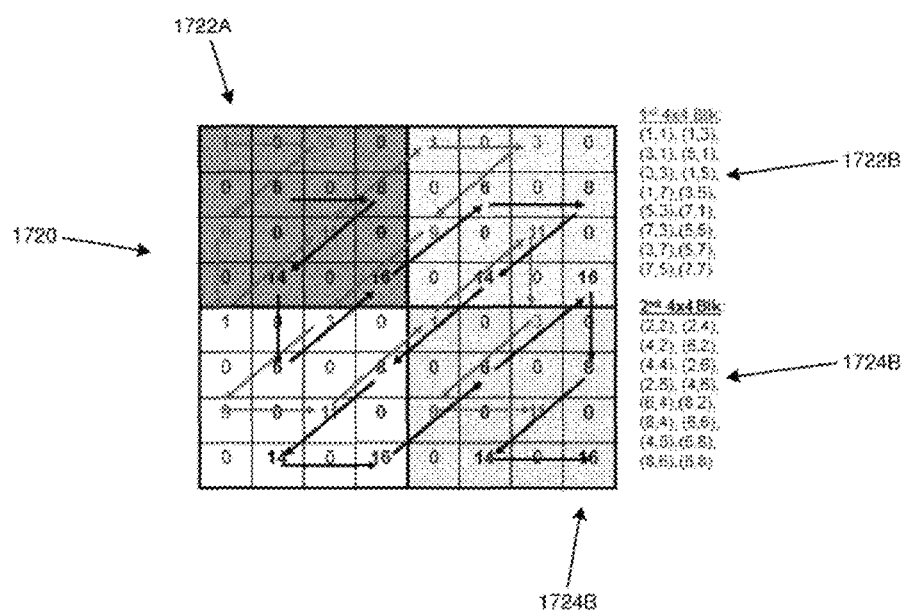
Figure 17D:
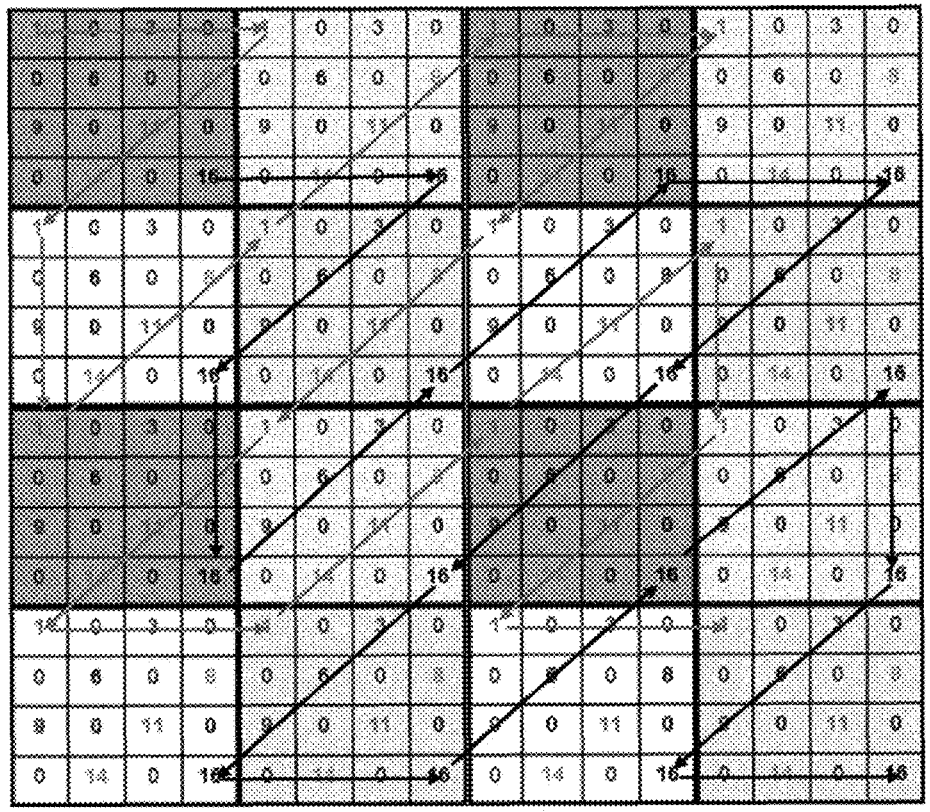

Reference is now made to FIGS. 17A-D, which are examples of matrices containing quantized coefficients and zero value coefficients, and examples of some coefficient scanning patterns for coding of the quantized coefficients, in accordance with some embodiments of the present disclosure. FIGS. 17A-7C depict quantized coefficient matrices based on an 8×8 rotational symmetry block. FIG. 17D depicts a quantized coefficient matrix based on a 16×16 rotational symmetry block. The matrices illustrated in FIGS. 17A-17D are scanned in a certain pattern to comply with the 4×4 structure defined by the H.265 standard.

FIG. 17A depicts a matrix 1702 and complementary scanning patterns performed at different band of frequencies. Arrow set 1704A and related scanned matrix locations 1704B depicts low band frequency scanning. Arrow set 1706A and related scanned matrix locations 1706B depicts high band frequency scanning. Each respective arrow set scans 16 non zero DCT coefficients.

FIG. 17B depicts a matrix 1710 and complementary scanning pattern performed for different divisions of the matrix. Arrow set 1712A and related scanned matrix locations 1712B depict scanning of the top pair of side by side 4×4 sub-areas. Arrow set 1714A and related scanned matrix locations 1714B depict scanning of the bottom pair of side by side 4×4 sub-areas.

FIG. 17C depicts a matrix 1720 and an interleaving zig-zag scanning pattern based on 4×4 zig-zag patterns. Arrow set starting at 1722A and related scanned matrix locations 1722B depict one of the interleaved zig-zag scan patterns. Arrow set ending at 1724A and related scanned matrix locations 1724B depict the other interleaved zig-zag scan pattern.

FIG. 17D depicts a 16×16 matrix and interleaving 4×4 zig-zag scanning patterns for scanning the matrix. Scanned locations within each 4×4 sub-area of the matrix are displayed below the matrix.

Optionally, the last non-zero transform coefficient (e.g., the DCT coefficient and/or the quantized coefficient) is encoded. The location of the last non-zero coefficient in the encoded block may be transmitted to the decoder, for decoding the encoded coefficients. The last possible non-zero coefficient in an M×N block is located at the M,N position of the matrix. The number of bits to represent the location of the last non-zero coefficient is related to the maximum value of the position of the last non-zero coefficient within the matrix. As described herein, one half of the transform (e.g., DCT) coefficients are zeroed.

Optionally, the non-zero transform coefficients are packed from occupying a total size of M×N into a smaller area of size ½ M×N. The coefficient packing reduces the number of transmitted bits. The reduction in number of bits improves efficiency of the system.

The location of the last non zero coefficient in each matrix may be shifted according to the order of the coefficient scanning performed on the matrix, for example, towards the upper left corner of the matrix. The shifting of the non-zero values improves system performance by reducing the size of the location of the last transform coefficient.

In a similar manner, packing for vertical, horizontal and/or other scanning order may be used for packing the non-zero transform coefficients in order to indicate to the decoder the location of the last non-zero transform coefficient.

Optionally, the coding of the quantized coefficients is performed by storing coordinates of a last transform coefficient in the dataset as part of the encoding.

Figure 18A:
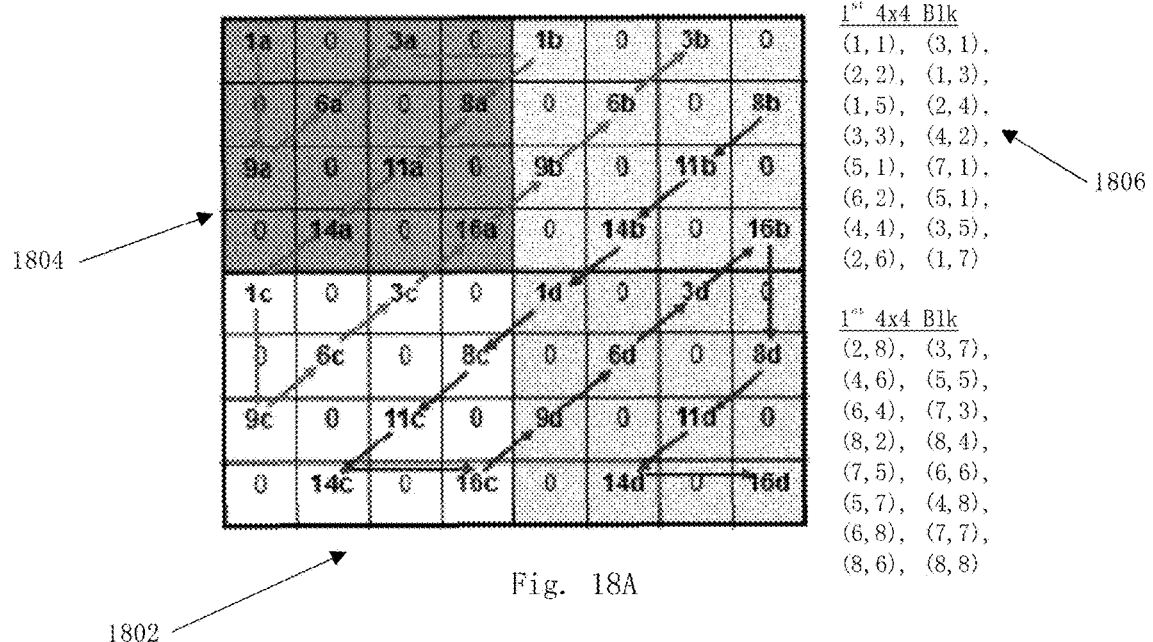
Figure 18B:
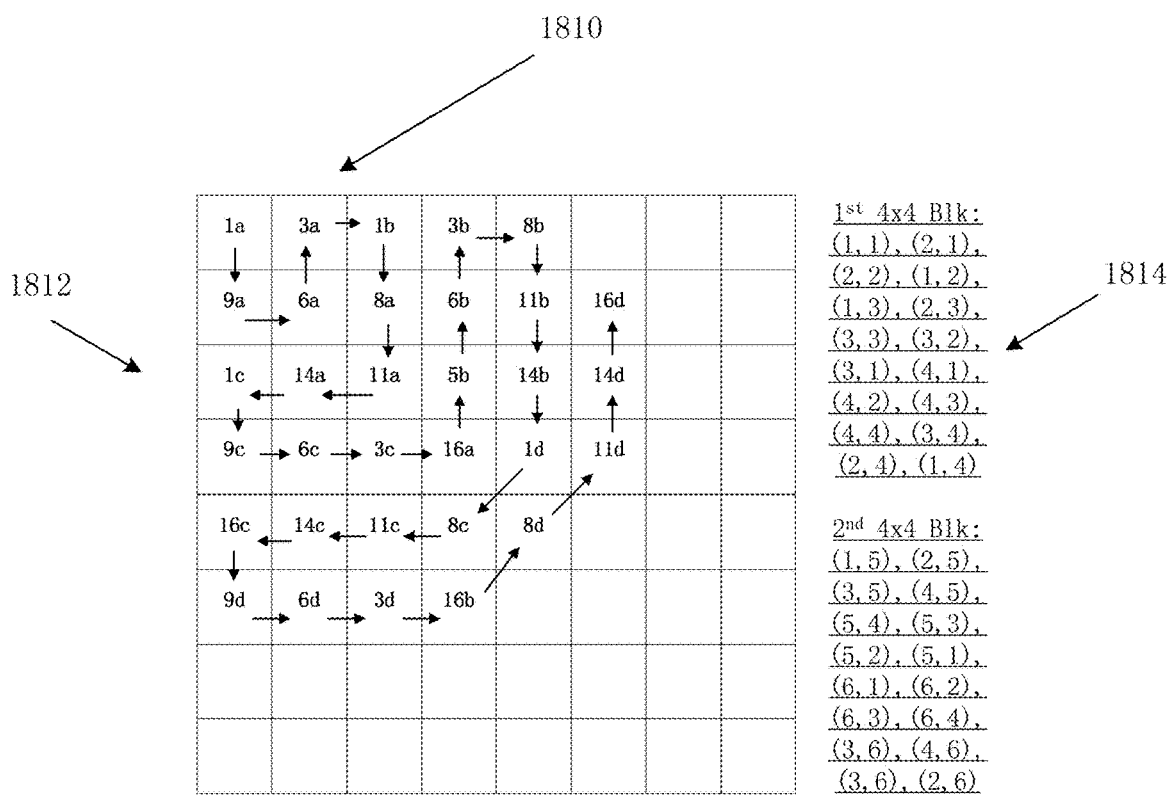

Reference is now made to FIGS. 18A-18C, which are matrices depicting packing of the non-zero coefficients, in accordance with some embodiments of the present disclosure.

FIG. 18A depicts a matrix 1802 with half of the coefficients having zero values, and the coefficient scanning order (shown by the line pattern 1804 within the matrix and adjacent set of coordinates 1806), before packing of the non-zero coefficients. The location of the last coefficient in the block is shifted towards the upper left corner according to the scanning order. The location of the last coefficient is compressed, improving system performance.

FIG. 18B depicts matrix 1810 after packing of the coefficients of matrix 1802 based on the coefficient scanning order. The packed arrangement is represented by line pattern 1812, which is a packed arrangement of line pattern 1804. The updated set of coordinates 1814 represents the packed arrangement of coordinates 1806.

FIG. 18C is another representation to help understand the packing of the coefficients of matrix 1802 of FIG. 18A. FIG. 18C depicts the post-packing line pattern 1812 of FIG. 18B overlaid on the pre-packed coefficients within matrix 1802 of FIG. 18A.

Figure 10:
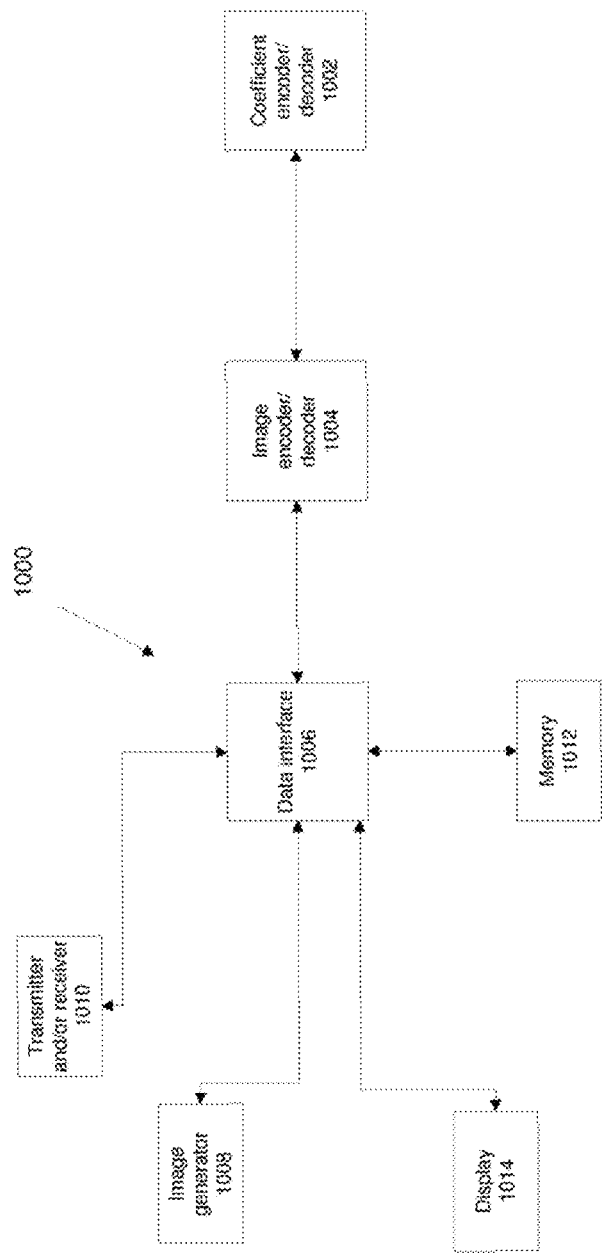
FIG. 10 is a block diagram of an exemplary system for image compression and decompression incorporating a coefficient encoder/decoder based on FIG. 1 and/or FIG. 2, in accordance with some embodiments of the present disclosure.

Reference is now made to FIG. 10, which is a block diagram of an exemplary system woo for image compression and decompression incorporating a coefficient encoder/decoder 1002, in accordance with some embodiments of the present disclosure. Encoder/decoder 1002 may include the media encoder 202 as described with reference to FIG. 2, a variant of encoder 202 (e.g., without processor 204, using the processor of another encoder/decoder), and/or another implementation of the method of FIG. 1. Integration of encoder 1002 within system moo improves coding efficiency of the images and/or video, which improves overall performance of system moo, for example, by improving compression performance, by reducing processor resource requirements, transmitter/receiver requirements, and/or memory requirements. Integration of encoder 1002 within system 1000 allows for higher image quality, higher image resolution and/or a larger number of images to be processed using the same resources.

Coefficient encoder/decoder 1002 may be implemented within devices and/or systems associated with digital images and/or videos, for example, within a digital camera, within a television (e.g., high definition TV), within a digital camcorder, within a television broadcasting unit, within a Smartphone (or other mobile device), within a web-browser, within computer software to view and/or edit images and/or videos, within network devices (to improve network performance), within real-time conversation application (e.g., video chat, video conferencing, and telepresence systems). Implementation of encoder/decoder 1002 may improve performance of the device and/or system by reducing resource requirements (e.g., memory), for example, allowing more pictures and/or videos to be saved on a memory, allowing pictures and/or videos with higher quality and/or resolution to be saved, and lowering the size of each picture and/or video thus allowing for faster transmission of the picture and/or video over a network connection.

Encoder/decoder 1002 is integrated with an image encoder/decoder 1004 configured to encode and/or decode images and/or video by compression and/or decompression. Encoder/decoder 1004 may be based on a standard (e.g., HVEC, MPEG-4, JPEG) and/or based on one or more proprietary protocols. Coefficient encoder/decoder 1002 may be integrated with image encoder/decoder 1004, for example, as a chip or other hardware element(s) that is integrated within the hardware of encoder/decoder 1004, as a chip or other hardware element that plugs into encoder/decoder 1004, as external software modules, as software modules integrated within the code of encoder/decoder 1004, and/or combinations thereof.

Image encoder/decoder 1004 may include encoding and/or decoding components, for example, one or more of: quantization (e.g., by quantization module 218), coefficient scanning (e.g., by a coefficient scanning module), entropy coding (e.g., by entropy coding module 220), intra and/or inter image predictions (e.g., by a prediction module).

System 1000 includes a data interface 1006 coupled to image encoder/decoder 1004, configured to receive one or more images, for example, from an image generator 1008, from a transmitter/receiver 1010 (e.g., network interface, television cable, wireless transceiver), and/or from a memory 1012 storing images thereon.

The received images are processed by image encoder/decoder 1004, with transform coefficients being generated for one or more blocks of one or more image frames as described with reference to FIG. 1 and/or FIG. 2. Blocks (or sub-blocks) that are selected to be split by the selected mask are processed by coefficient encoder/decoder 1002, as described herein. Blocks (or sub-blocks) that are selected to be processed in their entirety (i.e., are not split based on the mask) are processed by image encoder/decoder 1004 based on an image and/or video compression standard such as H.265.

Image encoder/decoder 1004 may perform integer transform, scaling, quantization, and/or inverse quantization, when the entire block (or sub-block) is processed as defined by a standard, or when the block is split into the pair of rotational symmetry blocks (as described herein), for example, based on the H.265 standard, or other standards.

The compressed images may be stored on memory 1012, and/or transmitted using transmitter/receiver 1010.

When decoding, images may be retrieved from storage on memory 1012, and/or received from transmitter/receiver 1010. Decoding occurs by image encoder/decoder 1004, with decoding of transform coefficients by coefficient encoder/decoder 1002 as described herein. The decoded image may be displayed on a display 1014, transmitted by transmitter receiver 1010, and/or stored on memory 1012.

Figure 19A:
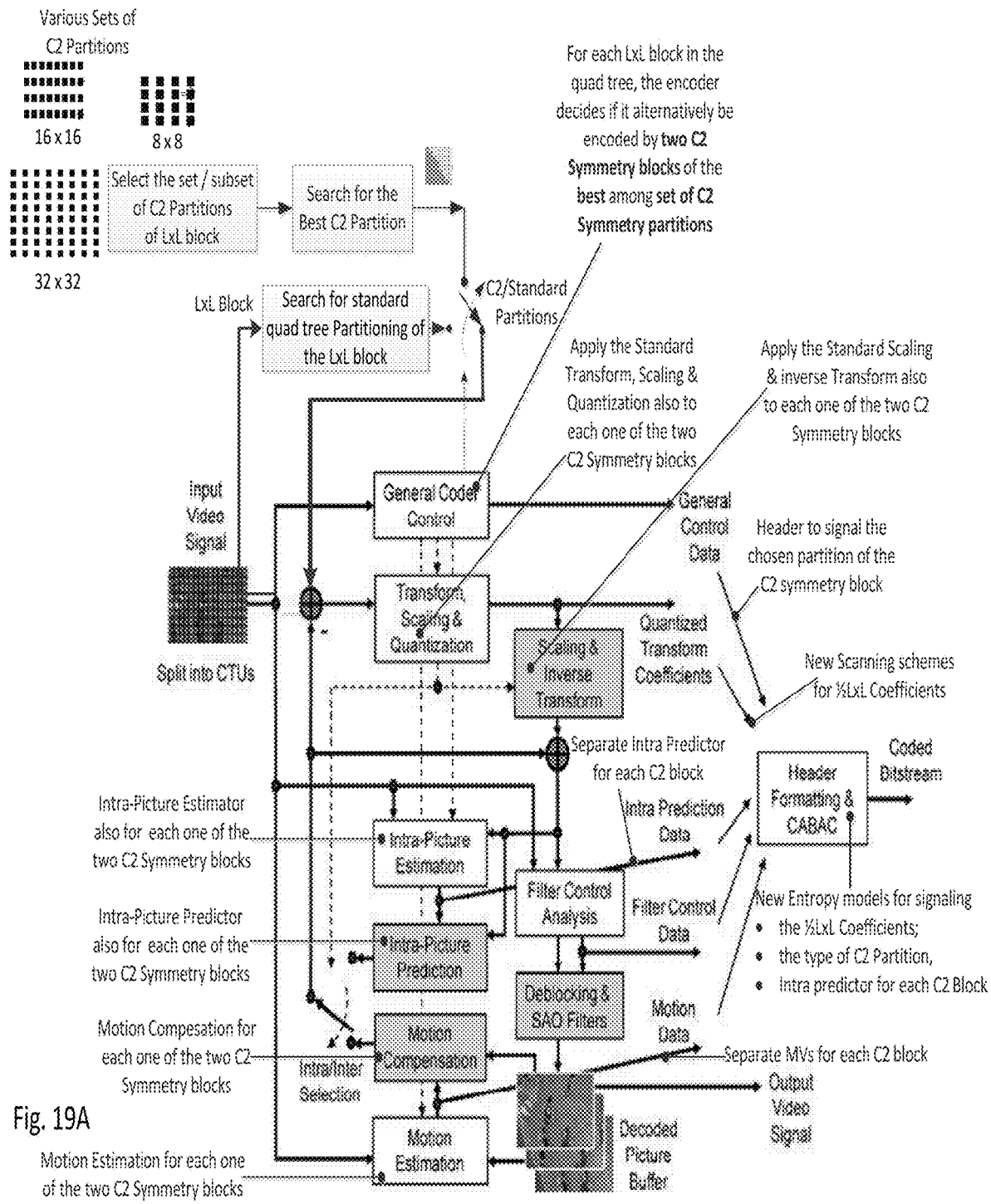
FIG. 19A is a block diagram depicting encoding by the video encoder of FIG. 10, based on the H.265 standard, integrated with the coefficient encoder, in accordance with some embodiments of the present disclosure.

Reference is now made to FIG. 19A, which is a block diagram depicting video encoding by image encoder 1004 of FIG. 10, based on the H.265 standard, integrated with coefficient encoder 1002, in accordance with some embodiments of the present disclosure. Non-bolded blocks and/or letters depict encoding based on the H.265 standard performed by encoder 1004. Bolded blocks and/or bolded letters depict structures and/or functions performed by encoder 1002. With reference to the HEVC standard executed by image encoder/decoder 1004 (function shown in italics), coefficient encoder/decoder 1002 may be integrated to improve performance as follows:

General Coder Control: For each block or sub-block, encoder 1002 decides when the block is to be encoded by splitting the block using the selected mask, and when the block is to be encoded in its entirety by the method defined by the HEVC standard. The general control data includes header signaling the selected mask used to split the block and generate the pair of symmetry blocks.

Transform, Scaling, and Quantization: The HEVC methods are applied to each one of the pair of rotational symmetry blocks generated by encoder 1002. Coefficients are scanned by skipping the zero values for the ½ L×L quantized transform coefficients, as described herein.

Scaling & Inverse Transform: The HEVC methods are applied to each one of the pair of rotational symmetry blocks generated by encoder 1002.

Intra Picture Estimation: The HEVC methods are applied to each one of the pair of rotational symmetry blocks.

Intra Picture Prediction: The HEVC methods are applied to each one of the pair of rotational symmetry blocks. Separate intra predictors are generated for each of the pair of rotational symmetry blocks.

Motion Compensation: The HEVC methods are applied to each one of the pair of rotational symmetry blocks.

Motion Estimation: The HEVC methods are applied to each one of the pair of rotational symmetry blocks. Separate motion vectors are generated for each of the pair of rotational symmetry blocks.

Header Formatting & Context Adaptive Binary Arithmetic Coding (CABAC): Entropy models (as described herein) are applied for signaling the ½ L×L coefficients, the selected mask, and/or intra predictor for each of the pair of rotational symmetry blocks.

Figure 19B:
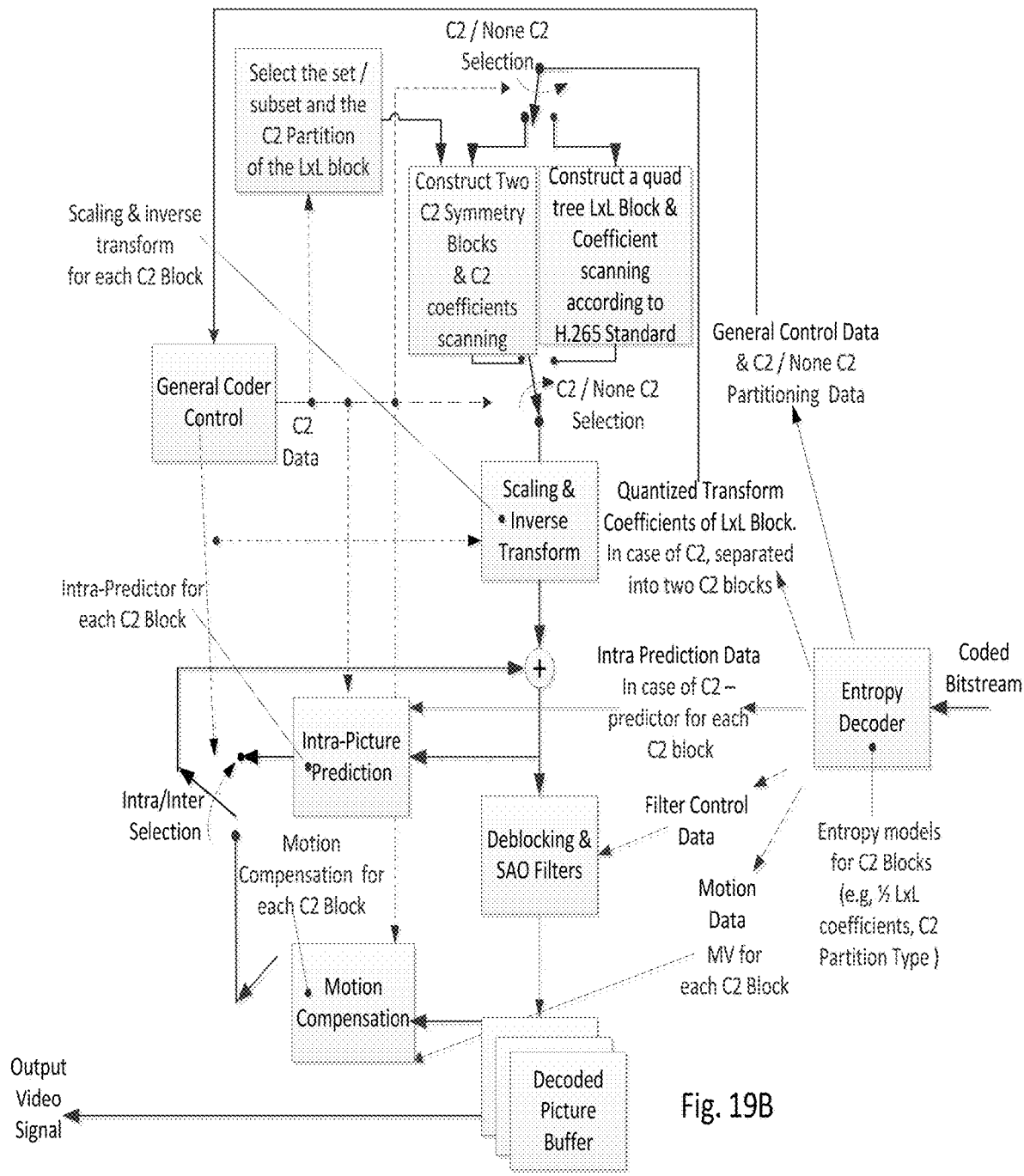
FIG. 19B is a block diagram depicting decoding by the video decoder of FIG. 10, based on the H.265 standard, integrated with the coefficient decoder, in accordance with some embodiments of the present disclosure.

Reference is now made to FIG. 19B, which is a block diagram depicting video decoding by image decoder 1004 of FIG. 10, based on the H.265 standard, integrated with coefficient decoder 1002, in accordance with some embodiments of the present disclosure. The decoding functions are based on the encoded functions described with reference to FIG. 10, and as described herein. Non-bolded blocks and/or letters depict decoding based on the H.265 standard performed by decoder 1004. Bolded blocks and/or bolded letters depict structures and/or functions performed by decoder 1002. C2 represents the pair of rotational symmetry blocks.

Figure 20:
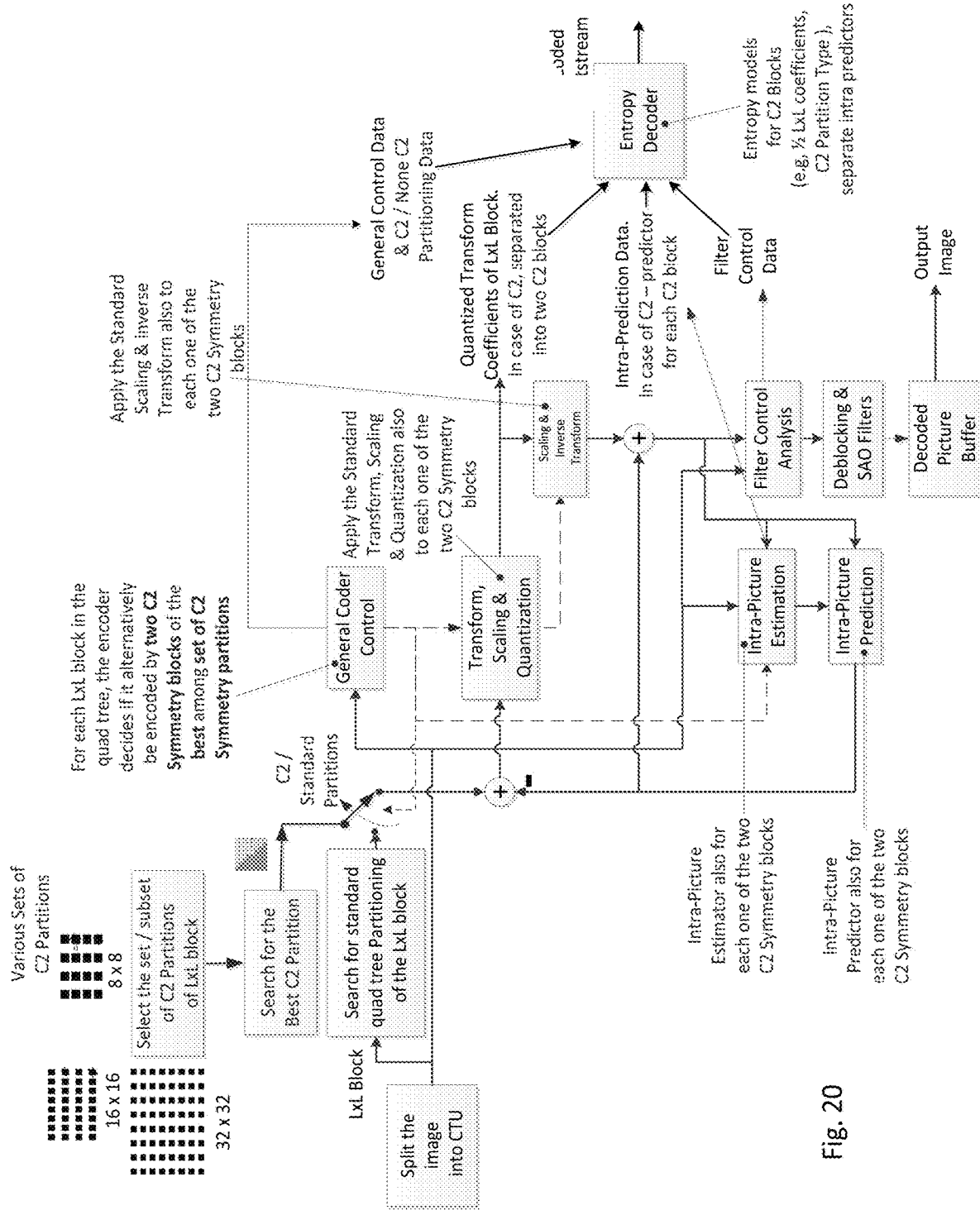
FIG. 20, is a block diagram depicting single image encoding by the image encoder of FIG. 10, based on the H.265 standard (e.g., after removal of the inter coding parts of FIG. 19A), integrated with the coefficient encoder, in accordance with some embodiments of the present disclosure.

Reference is now made to FIG. 20, which is a block diagram depicting single image encoding by image encoder 1004 of FIG. 10, based on the H.265 standard, (e.g., after removal of the inter coding parts of FIG. 19A) integrated with coefficient encoder 1002, in accordance with some embodiments of the present disclosure. Structures, functions, and/or data flows related to inter image blocks are removed for the single image encoding. Non-bolded blocks and/or letters depict encoding based on the H.265 standard performed by encoder 1004. Bolded blocks and/or bolded letters depicts structures and/or functions performed by encoder 1002.

Figure 21:
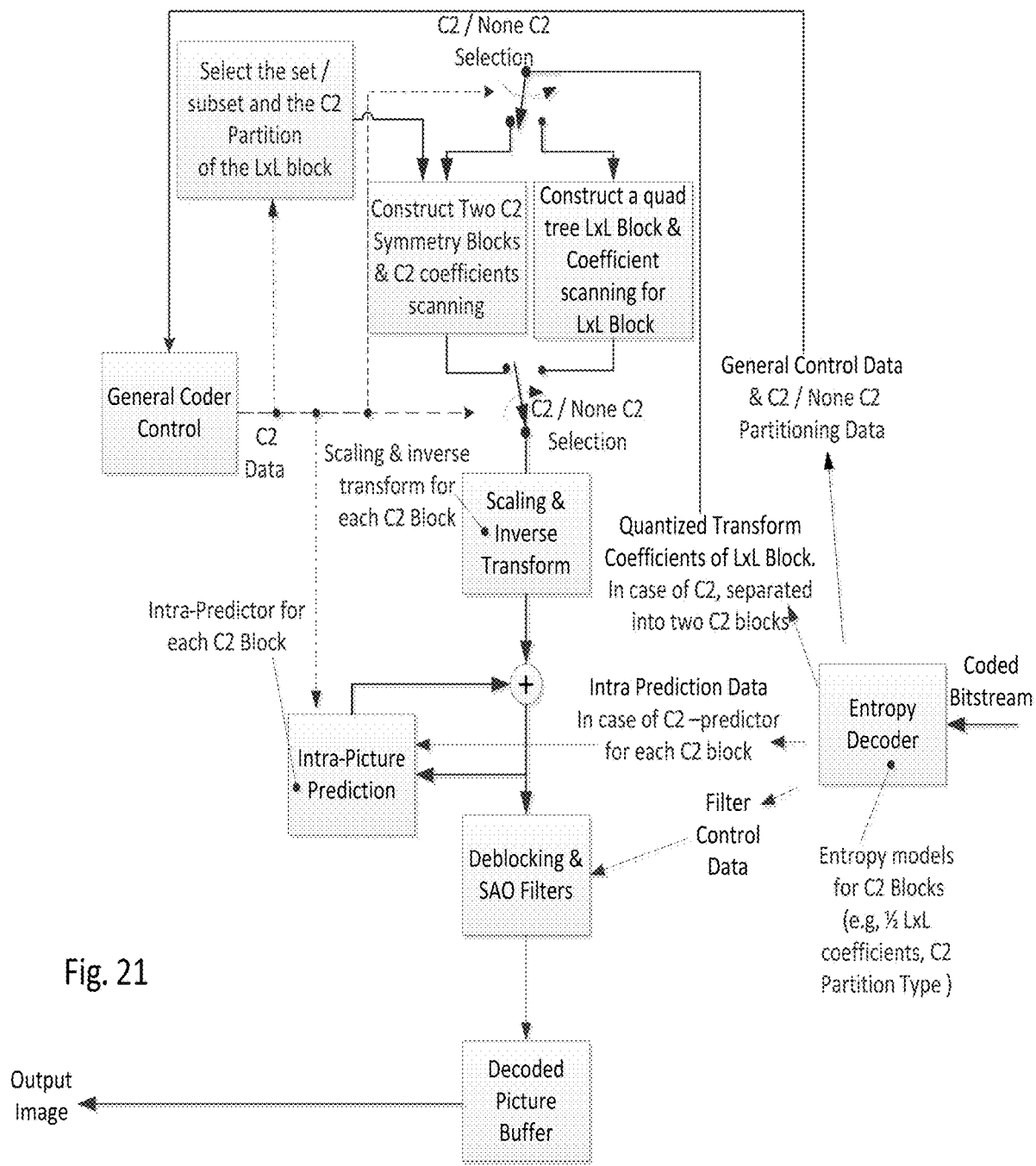
FIG. 21, is a block diagram depicting single image decoding by the image decoder of FIG. 10, based on the H.265 standard (e.g., after removal of the inter coding parts of FIG. 19B), integrated with the coefficient decoder, in accordance with some embodiments of the present disclosure.

Reference is now made to FIG. 21, which is a block diagram depicting single image decoding by image decoder 1004 of FIG. 10, based on the H.265 standard (e.g., after removal of the inter coding parts of FIG. 19B), integrated with coefficient decoder 1002, in accordance with some embodiments of the present disclosure. Structures, functions, and/or data flows related to inter image blocks are removed for the single image decoding. Non-bolded blocks and/or letters depict decoding based on the H.265 standard performed by decoder 1004. Bolded blocks and/or bolded letters depicts structures and/or functions performed by decoder 1002.

Optionally, at 122, one or more of blocks 102-120 are repeated for other blocks and/or sub-blocks within the frame. One or more of blocks 102-120 may be repeated for other frames. It is noted that blocks of a certain frame may be processed in parallel.

Figure 11:
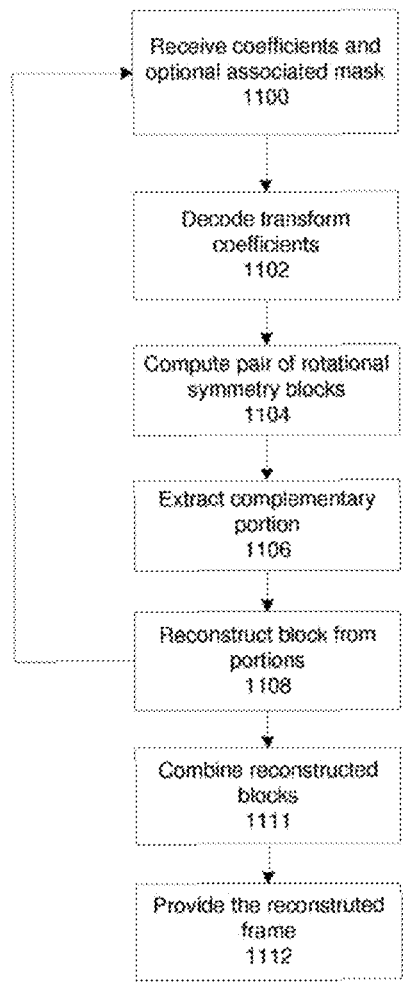
FIG. 11 is a flowchart of a method for decoding a set of transform coefficients coding a block in a frame, in accordance with some embodiments of the present disclosure.

Reference is now made to FIG. 11, which is a flowchart of a method for reconstructing a block in a frame from a set of transform coefficients, in accordance with some embodiments of the present disclosure. The method of FIG. 11 is based on, and complementary to the method of FIG. 1. The method of FIG. 1 depicts transforming a block, which is inverse transform based on the method of FIG. 11. The method of FIG. 11 may be performed by the transform part of FIG. 2 of a media encoder configured to act as an inverse transform part of a media decoder. The inverse transform may be performed by the respective transform modules, and/or by other modules configured to perform one or more of the inverse transform processing components.

At 1100, one or more transform (e.g., encoded and/or quantized) coefficients representing an encoded frame or portion thereof are received. The transform coefficients may be received as a bitstream. A signal representing an associated selected rotational symmetry mask may be received, such as within the bitstream. The rotational symmetry mask defines a rotational symmetry in a multi dimensional space having the size and/or shape as the decoded block of a frame.

A signal representing an associated selected rotational symmetry mask may be received or assumed to be known when it not received deliberately (e.g., the mask is deduced from the direction of the predictor). The rotational symmetry mask defines a rotational symmetry in a multi dimensional space having the size and/or shape as the decoded block of a frame.

At 1102, transform coefficient(s) representing each member of a pair of rotational symmetry blocks are decoded from the bitstream.

The transform coefficient(s) represent one or more members of a pair of rotational symmetry blocks. It is noted that in some cases, one or more rotational symmetry blocks without any coefficients may be received, and/or not received (e.g., the blocks without coefficients may be skipped), for example, a signal representing no transform coefficients representing rotational symmetry blocks may be received. Alternatively or additionally, it is noted that in some cases, only one coefficient is received for the entire block (e.g., the DC coefficient).

At 1104, the pair of rotational symmetry blocks are computed based on inverse transform of the decoded transform coefficients. Each member of the pair of rotational symmetry blocks includes one of two complementary portions.

At 1106, each portion of the two complementary portions is extracted from each respective member of the pair of rotational symmetry blocks.

At 1108, a block is reconstructed from the two complementary portions. The reconstruction may be guided based on the rotational symmetry mask. Alternatively, block is reconstructed from the portions without the mask, guided based on forming a square or rectangular block, for example, fitting the two portions together like puzzle pieces.

Optionally, the block is designated within the frame.

Optionally, blocks 1100-1108 are repeated (in parallel and/or sequentially) to decode and reconstruct multiple blocks (and/or sub-blocks) of the frame.

At 1111, the multiple decoded blocks are combined into the frame or portion thereof.

At 1112, the decoded frame is provided for further processing, storage, and/or is transmitted. The frame may be displayed on a screen, for example, as part of a video.

Reference is now made to FIGS. 12A-12I, which include an image and graphs of experimental results of executing the methods and/or systems described herein. The graphs demonstrate improvement in performance using the systems and/or methods described herein, relative to image compression using methods based on compression standards. The experiments are based on individual frames using intra-frame coding methods.

The experiments are performed as follows:

One frame from each YUV video sequence is obtained. Various frame sizes are used, as defined by different standards, including: common intermediate format (CIF), quarter-CIF (QCIF), and high definition (HD). Each frame is partitioned uniformly into blocks of a fixed N×N size, including sizes of 8×8, 16×16, and 32×32 pixels.

A rotational symmetry mask library containing 2×(N−1) different line orientations is generated for mask selection and application.

Integer transformation, scaling, and quantization schemes are applied, based on the H.265 standard.

Coefficient scanning is performed by subdividing the N×N matrix of transform coefficients into 4×4 sub matrices of transform coefficients. Coefficient scanning is performed using a zig-zag scan in each 4×4 matrix while skipping the zero coefficients.

Transform coefficients are coded based on the H.264 CAVLC standard, which also defined signals for the prediction mode, the mask type and the MBtype (defined herein as the encoded block that was selected (i.e., the standard N×N block or block split into the two complementary portions as described herein).

Block intra-prediction for the N×N blocks is based on four modes; vertical (V), horizontal (H), DC (i.e., flat) (D) and plane (P). Coding members of the pair of rotational symmetry blocks is based on separate and/or common intra-predictors. The common intra-predictors include the 4 intra modes; V, H, D, and P. The separate intra-predictors include the 16 intra modes based on permutations of combinations of the 4 intra modes; VV, VH, . . . , and PP.

The decision of whether to encode a certain block based on standard N×N encoding methods, or to apply a rotational symmetry mask and encode the pair of rotational symmetry blocks (as described herein) was based on a rate distortion (RD) cost function defined as: SSE+lambda*Bits, where: SSE denotes the sum of square error between the reconstructed block and the input block, lambda denotes a term dependent on a quantization parameter (Qp), and Bits denotes the number of encoded bits in the block including the signaling bits. The encoding decision is also made based on the Percentage of Non-Zero coefficients (represented in the graphs by PerNZ Coeff).

The results are summarized as follows:

A reduction in bit rate of up to 15% for the same PSNR is shown. For 35 QCIF sequence frames, divided into blocks of size 16×16, an average reduction of about 7% in bit rate for a PSNR range of 35-45 dB was achieved. For 10 larger size sequence frames, divided into blocks of size 16×16, an average reduction of about 7.5% was achieved.

Figure 12A:
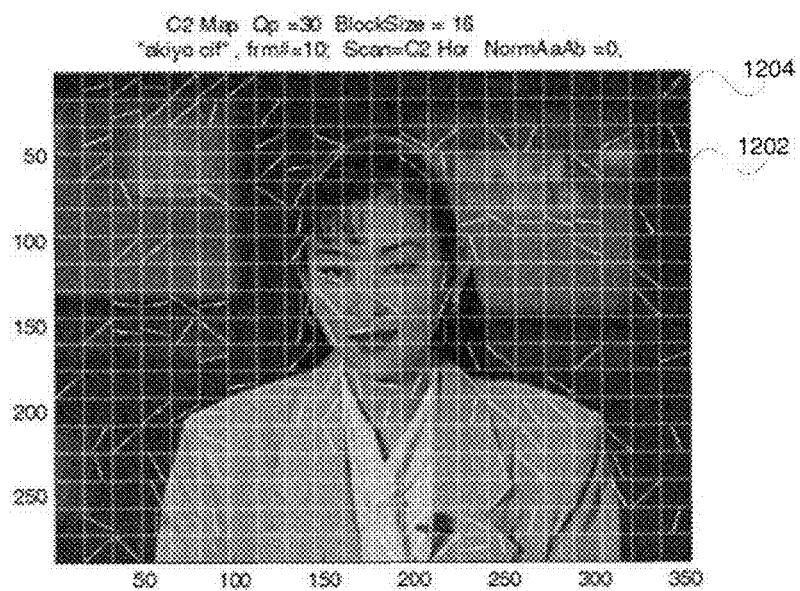
FIGS. 12A-12I include an image and graphs of experimental results of executing the methods and/or systems described herein.

FIG. 12A is an exemplary of an image (i.e., frame) being processed in accordance with systems and/or methods described herein as part of the experiment described herein. The image corresponds to the $10^{th}$ frame of a CIF sequence name akiyo.cif. The CIF frame has a size 352×288 pixels. The frame is partitioned uniformly into blocks based on square N×N blocks, where N=16 pixels (an example block is depicted by 1202). The frame is encoded using $Qp_{=30}$. A rotational symmetry mask library containing 2(N−1)=30 different line orientations provides a basis for selection of masks for splitting the block. Blocks having associated selected masks with line orientation are depicted in the figures, for example, block with mask 1204. In many cases, the mask line follows the edge within the block. Blocks for which no mask was selected were encoded as a single N×N block, and depicted in the image without the mask, for example, block 1202.

The graphs of FIGS. 12B-I include experimental results based on the processing of FIG. 12A.

Figure 12B:
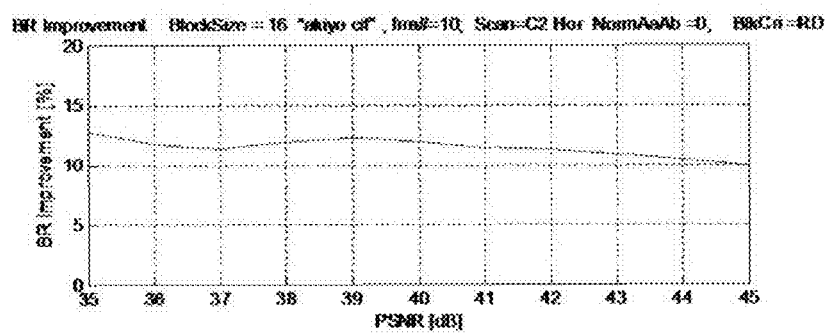

FIG. 12B is a graph depicting improvement in terms of bit rate for the entire frame of FIG. 12A when masks are selected to split the block into two complementary portions for encoding, over the encoding image of FIG. 12A using standard N×N transformation blocks, at the same objective quality level (represented by PSNR). The graph depicts the percent of bit rate improvement as a function of PSNR. It is noted that an improvement in bit-rate of over 10% was achieved for the image of FIG. 12A using the systems and/or methods described herein.

Figure 12C:
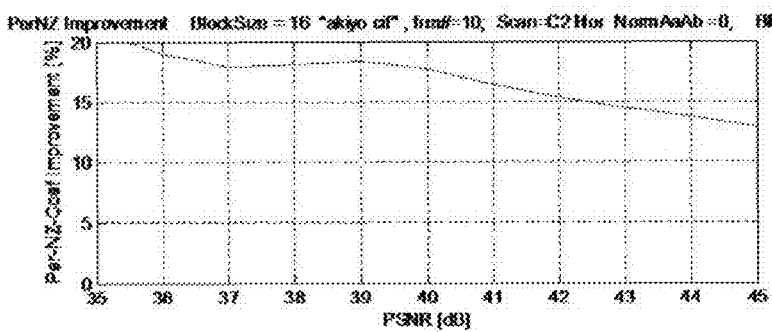

FIG. 12C is a graph depicting improvement in terms of per non-zero (PerNZ) coefficients for the entire frame of FIG. 12A when masks are selected to split the block into two complementary portions for encoding, over the encoding image of FIG. 12A using standard N×N transformation blocks, at the same objective quality level (represented by PSNR). The number of transform coefficients that are non-zero after quantization are used to estimate the number of encoded bits for coding the transform coefficients. It is noted that the non-zero coefficient measure does not include the overhead of signaling bits (e.g., prediction mode, mask selection mode, and MB type). The graph demonstrates improvement in terms of percentage of non-zero transform coefficients of about 15% using the systems and/or methods described herein.

Figure 12D:
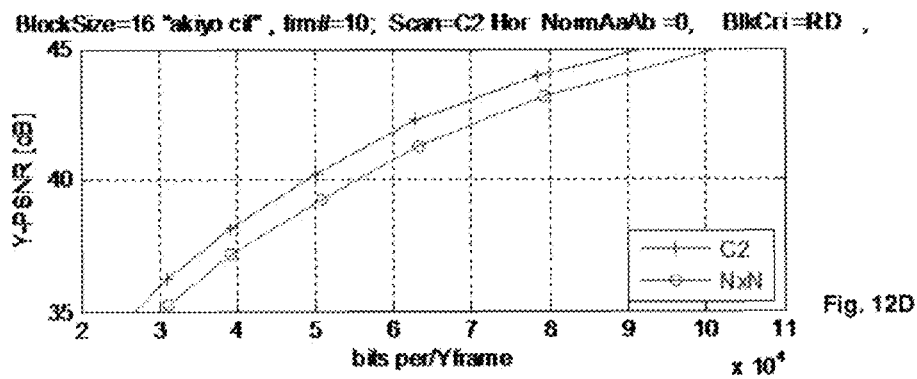

FIG. 12D is a graph depicting Y-PSNR as a function of bit rate, for the C2 processing scheme and for the N×N processing scheme. The C2 processing scheme is the methods and/or systems described herein based on either mask selection and generation of the two complementary portions for the transformation block, or encoding the N×N block using standard methods. The selection of the mask based encoding or the N×N block based encoding is based on a certain measure which is associated with each mask based partition and each N×N block. The N×N processing scheme is based on the standard method of encoding each block as a single N×N block. The graph demonstrates that the C2 method achieved a lower bit rate than the N×N method, for the same PSNR value, which represents improved quality for the same bit rate.

Figure 12E:
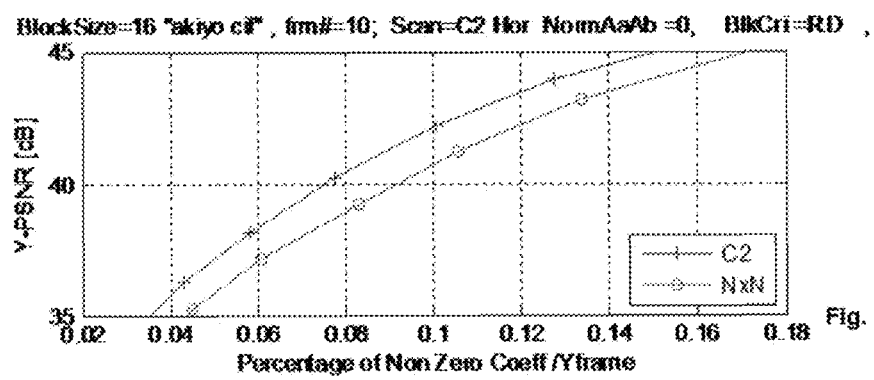

FIG. 12E is a graph depicting Y-PSNR as a function of the percent of non-zero transform coefficients for the entire frame, based on the C2 method and the N×N method. The graph depicts improved compression performance based on the C2 method (i.e., the systems and/or methods described herein), in terms of lower percentage of non-zero transform coefficients for the same PSNR, which represents improved quality for the same percentage of non-zero transform coefficients.

Figure 12F:
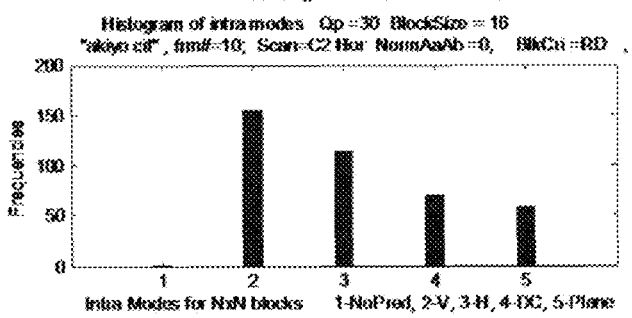

FIG. 12F is a histogram depicting frequency of application of the intra-prediction mode for the N×N standard case. On the x-axis, 1 denotes no prediction, 2 denotes vertical prediction, 3 denotes horizontal prediction, 4 denotes DC prediction, and 5 denotes plane prediction.

Figure 12G:
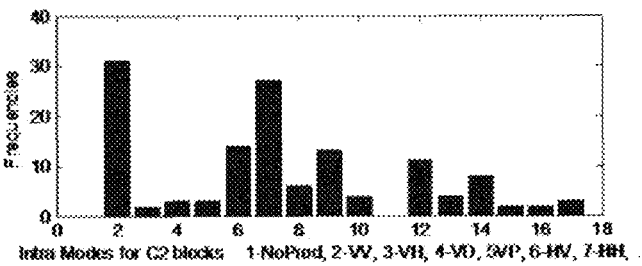

FIG. 12G is a histogram depicting frequency of application of the intra-prediction mode for the C2 scheme of the methods and/or systems described herein, for 16 separate predictor modes: 1 denotes no prediction, 2 denotes VV prediction, 3 denotes VH prediction, 4 denotes VD prediction, 5 denotes VP prediction, 6 denotes HV prediction, . . . , 17 denotes PP prediction.

Figure 12H:
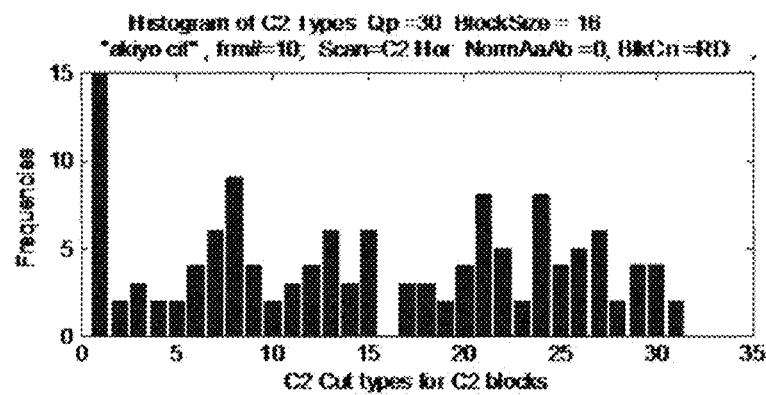

FIG. 12H is a histogram depicting frequency of application of each mask of the library of 30 rotational symmetry masks.

Figure 12I:
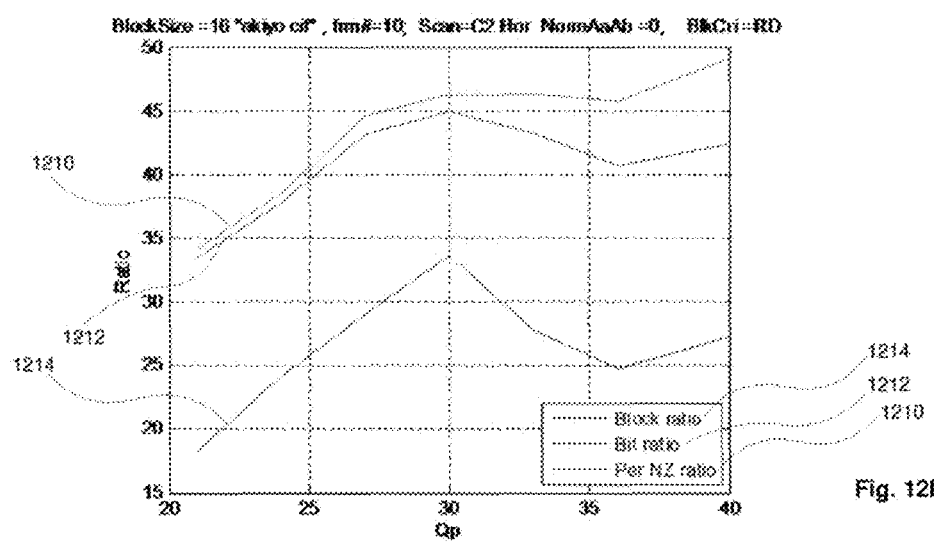

FIG. 12I is a graph depicting the ratio of three variables as a function of Qp.

Line 1214 denotes the percentage of blocks for which the C2 method was selected over the standard N×N method for the blocks of the image. For example, at Qp=30, about 35% of the blocks in the frame were encoded based on the C2 method (based on mask selection and encoding of the two complementary portions), while the remaining (about 65%) were encoded as a single 16×16 block.

Line 1212 denotes the percentage of bits of the frame that were encoded based on the C2 method. For example, at Qp=30, about 45% of the bits in the frame were encoded based on the C2 method.

Line 1210 denotes the percentage of per non-zero transform coefficients of the frame that were encoded using the C2 method. For example, at Qp=30, over 45% of the per non-zero transform coefficients in the frame were encoded using the C2 method.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image encoders and/or image decoders will be developed and the scope of the term encoder is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An apparatus adapted to generate a plurality of transform coefficients for coding a frame or portion thereof comprising:
    a media encoder coupled to a data interface adapted to receive a frame or portion thereof;
    wherein the media encoder is adapted to iteratively subdivide each block of a plurality of blocks partitioned in a frame or portion thereof,
    wherein the media encoder is adapted to process a subdivided block of the plurality of blocks, during each iteration of a plurality of iterations, by:
        selecting a rotational symmetry mask fulfilling an efficiency measure for coding said block, the rotational symmetry mask selected from a plurality of rotational symmetry masks which define a plurality of different rotational symmetries in a multi dimensional space having a size and a shape that is the same as the subdivided block; and
        performing, when the efficiency measure is fulfilled:
            splitting the subdivided block to two complementary portions based on the rotational symmetry mask,
            generating a pair of rotational symmetry blocks each having one of the two complementary portions, and
            computing a plurality of transform coefficients from the pair of rotational symmetry blocks.

2. The apparatus of claim 1, wherein the media encoder is adapted to, when the efficient measure is fulfilled, add the pair of rotational symmetry blocks to a dataset comprising a plurality of pairs of rotational symmetry blocks generated from at least some of the plurality of blocks.

3. The apparatus of claim 2, wherein the media encoder is adapted to, when the efficiency measure is not fulfilled, iteratively subdivide the subdivided block into a plurality of additional subdivided blocks and repeat the iteratively subdividing for each of the plurality of additional subdivided blocks.

4. The apparatus of claim 3, wherein, the media encoder is adapted to, for iteratively subdividing each of a plurality of blocks:
    use a tree structure mapping the subdividing of each of the plurality of blocks to support the iteratively subdividing; and
    update the tree structure with the pair of rotational symmetry blocks by adding two leaves each representing a member of the pair of rotational symmetry blocks.

5. The apparatus of claim 4, wherein the media encoder is further adapted to code each of the plurality of transform coefficients using an entropy context model selected according to a respective rotational symmetry mask used for generating a respective the pair of rotational symmetry blocks.

6. The apparatus of claim 4, wherein the computing the plurality of transform coefficients is performed by two dimensional (2D) Discrete Cosine Transform (DCT).

7. The apparatus of claim 4, wherein the media encoder is further adapted to perform, according to moving picture experts group (MPEG) format, at least one of:
    predicting at least one of the two complementary portions of the block
    computing at least one of the plurality of transform coefficients of at least one of the rotational symmetry blocks;
    quantizing at least one of the plurality of transform coefficients; and entropy coding a plurality of the transform coefficients to create an encoding of the frame or portion thereof.

8. The apparatus of claim 7, wherein the media encoder is further adapted to code the plurality of transform coefficients by scanning the plurality of transform coefficients while skipping a plurality of zeroed coefficients.

9. The apparatus of claim 7, wherein the media encoder is further adapted to code the plurality of transform coefficients by selecting a scanning pattern from a plurality of scanning patterns by matching the rotational symmetry mask one of the plurality of scanning patterns.

10. The apparatus of claim 7, wherein the media encoder is further adapted to code the plurality of transform coefficients by storing coordinates of a last transform coefficient in a dataset as part of the encoding.

11. The apparatus of claim 10, wherein the media encoder is further adapted to shift non-zero values of the plurality of transform coefficients according to an order of the coefficient scanning performed on a matrix in which the plurality of transform coefficients are arranged, wherein shifting the non-zero values reduces the size of the location of the last transform coefficient.

12. The apparatus of claim 4, wherein the data interface is further adapted to receive a bitstream of at least one transform coefficient representing an encoded frame or portion thereof; and
wherein the media encoder is further adapted to:
decode the at least one transform coefficient;
compute a plurality of pairs of rotational symmetry blocks based on inverse transform of the transform coefficients, each member of each pair of rotational symmetry blocks having one of two complementary portions;
reconstruct a plurality of blocks from each of the two respective complementary portions based on the respective rotational symmetry mask; and
combine the plurality of blocks into a frame or portion thereof.

13. The apparatus of claim 1, wherein the media encoder is adapted to select the rotational symmetry mask from a rotational symmetry mask library comprising a plurality of different rotational symmetry masks.

14. The apparatus of claim 13, wherein the media encoder is further adapted to select the rotational symmetry mask from the rotational symmetry mask library based on at least one efficiency criterion.

15. The apparatus of claim 13, wherein the media encoder is further adapted to select the rotational symmetry mask library from a plurality of rotational symmetry mask libraries each defined for another size of the subdivided block.

16. The apparatus of claim 13, wherein the media encoder is further adapted to code each of the plurality of transform coefficients using a spatial predictor selected according to a respective rotational symmetry mask used for generating a respective the pair of rotational symmetry blocks.

17. The apparatus of claim 1, wherein the media encoder is further adapted to independently code each rotational symmetry block using a respective motion vector, wherein each respective motion vector is selected according to each respective portion of the rotational symmetry block.

18. A method for decoding a frame or portion thereof based on a bitstream representing an encoded frame, comprising:
receiving a bitstream of at least one encoded transform coefficient representing an encoded frame or portion thereof;
decoding the at least one transform coefficient;
computing a plurality of pairs of rotational symmetry blocks based on inverse transform of the at least one transform coefficient, each member of each pair of rotational symmetry blocks having one of two complementary portions;
reconstructing a plurality of blocks from each of the two respective complementary portions based on a respective rotational symmetry mask; and
combining the plurality of blocks into a frame or portion thereof;
wherein the method is in particular adapted to operate an apparatus according claim 1.

19. A method, using the apparatus of claim 1 for encoding a frame or portion thereof, comprising:
partitioning iteratively the frame or portion thereof to a plurality of blocks;
iteratively subdividing each the plurality of blocks, during each iteration on a subdivided block of the plurality of blocks;
selecting from a library comprising a plurality of different rotational symmetry masks a rotational symmetry mask fulfilling an efficiency measure when coding the subdivided block;
splitting, using the rotational symmetry mask, the subdivided block into two complementary portions based on the rotational symmetry mask; generating a pair of rotational symmetry blocks each having one of the two complementary portions;
computing at least one transform coefficient from at least one of the pair of rotational symmetry blocks;
quantizing the at least one transform coefficient; and
coding the at least one transform coefficient to create an encoding of the frame or portion thereof.

20. A method for generating a plurality of transform coefficients for coding a frame or portion thereof, comprising
iteratively subdividing each of a plurality of blocks partitioned in a frame or portion thereof, during each of a plurality of iterations a subdivided block of the plurality of blocks is processed by:
selecting a rotational symmetry mask having a size and a shape as the block and fulfilling an efficiency measure for coding the block;
performing, when the efficiency measure is fulfilled:
splitting the subdivided block to two complementary portions based on the rotational symmetry mask,
generating a pair of rotational symmetry blocks each having one of the two complementary portions, and
computing at least one transform coefficient from at least one the pair of rotational symmetry blocks.

21. An apparatus adapted to decode a frame or portion thereof, comprising:
a media decoder coupled to a data interface adapted to receive a bitstream of at least one encoded transform coefficient representing an encoded frame or portion thereof;
wherein the media decoder is further adapted to:
decode at least one transform coefficient from the bitstream;
compute a plurality of pairs of rotational symmetry blocks based on inverse transform of the at least one decoded transform coefficient, each member of each pair of rotational symmetry blocks having one of two complementary portions;
reconstruct a plurality of blocks from each of the two respective complementary portions based on a respective rotational symmetry mask; and
combine the plurality of blocks into a frame or portion thereof.

* * * * *